(12) United States Patent
Mueck et al.

(10) Patent No.: US 10,812,986 B2
(45) Date of Patent: Oct. 20, 2020

(54) METHODS AND DEVICES FOR SHARED SPECTRUM ALLOCATION

(71) Applicant: Apple Inc., Cupertino, CA (US)

(72) Inventors: Markus Dominik Mueck, Unterhaching (DE); Christian Drewes, Germering (DE); Eryk Dutkiewicz, Sydney (AU); Beeshanga Jayawickrama, Sydney (AU); Pierce Rixon, Sydney (AU); Gengfa Fang, Sydney (AU); Michael Heimlich, Sydney (AU); Srikathyayani Srikanteswara, Portland, OR (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 16/305,931

(22) PCT Filed: Jul. 1, 2016

(86) PCT No.: PCT/US2016/040619
§ 371 (c)(1),
(2) Date: Nov. 30, 2018

(87) PCT Pub. No.: WO2018/004641
PCT Pub. Date: Jan. 4, 2018

(65) Prior Publication Data
US 2019/0191314 A1 Jun. 20, 2019

(51) Int. Cl.
*H04W 52/24* (2009.01)
*H04W 72/04* (2009.01)
(Continued)

(52) U.S. Cl.
CPC ........... *H04W 16/14* (2013.01); *H04W 16/06* (2013.01); *H04W 52/243* (2013.01);
(Continued)

(58) Field of Classification Search
CPC ............... H04W 16/14; H04W 52/243; H04W 72/0453; H04W 72/085; H04W 72/10; H04W 16/06
See application file for complete search history.

(56) References Cited

U.S. PATENT DOCUMENTS

| | | | |
|---|---|---|---|
| 2010/0081449 | A1 | 4/2010 | Chaudhri et al. |
| 2015/0181601 | A1 | 6/2015 | Schmidt et al. |

(Continued)

FOREIGN PATENT DOCUMENTS

| | | |
|---|---|---|
| WO | 0051390 A1 | 8/2000 |

OTHER PUBLICATIONS

"Report B1 from CEPT to the European Commission in response to the Mandate on 'Harmonised technical conditions or the 2300-2400 MHz ('2.3 GHz') frequency band in the EU for the provision of wireless broadband electronic communications services'", Draft CEPT Report 56, 41 pages.
(Continued)

*Primary Examiner* — Joseph E Dean, Jr.
(74) *Attorney, Agent, or Firm* — Kowert, Hood, Munyon, Rankin & Goetzel, P.C.

(57) ABSTRACT

A non-transitory computer readable medium may store instructions that when executed by a processor direct the processor to perform a radio spectrum allocation method including processing requested radio access terms of one or more lower-tiered users and determining available radio access terms from one or more incumbents, generating a plurality of candidate radio access licenses based on the requested radio access terms and the available radio access terms, determining radio conditions of each of the plurality of candidate radio access licenses, and based on the determined radio conditions, selecting a radio access license from the plurality of candidate radio access licenses and directing
(Continued)

the one or more lower-tiered users to use the selected radio access license or operated based on the selected radio access license.

21 Claims, 17 Drawing Sheets

(51) Int. Cl.
  *H04W 72/08* (2009.01)
  *H04W 16/14* (2009.01)
  *H04W 16/06* (2009.01)
  *H04W 72/10* (2009.01)
(52) U.S. Cl.
  CPC ..... *H04W 72/0453* (2013.01); *H04W 72/085* (2013.01); *H04W 72/10* (2013.01)

(56) References Cited

U.S. PATENT DOCUMENTS

| | | | | |
|---|---|---|---|---|
| 2015/0281971 A1* | 10/2015 | Mueck | ................ | H04W 16/14 455/454 |
| 2015/0373554 A1* | 12/2015 | Freda | ................ | H04L 5/0073 455/450 |
| 2016/0242031 A1* | 8/2016 | Ojanen | ................ | H04B 17/354 |

OTHER PUBLICATIONS

Mueck Markus Dominik et al., "Spectrum Sharing: Licensed Shared Access (LSA) and Spectrum Access System (SAS)", Oct. 2015, 27 pages, Version v1.0, INTEL.

"In the Matter of Amendment of the Commission's Rules with Regard to Commercial Operations in the 3550-3650 MHz Band", Report and Order and Second Further Notice of Proposed Rulemaking, released on Apr. 21, 2015, 187 pages, FCC 15-47, Federal Communications Commission.

Mustonen Miia et al., "Cellular architecture enhancement for supporting the european licensed shared access concept", IEEE Wireless Communications, Jun. 1, 2014, pp. 37-43, vol. 21, No. 3, XP011552466.

Mueck Markus Dominik et al., "Licensed shared access—State-of-the-art and current challenges", 2014 1st International Workshop on Cognitive Cellular Systems (CCS), IEEE, Sep. 2, 2014, pp. 1-5, XP032667933.

International Search Report received for International Application No. PCT/US2016/040619, dated Feb. 21, 2017, 14 pages (Reference Purpose Only).

\* cited by examiner

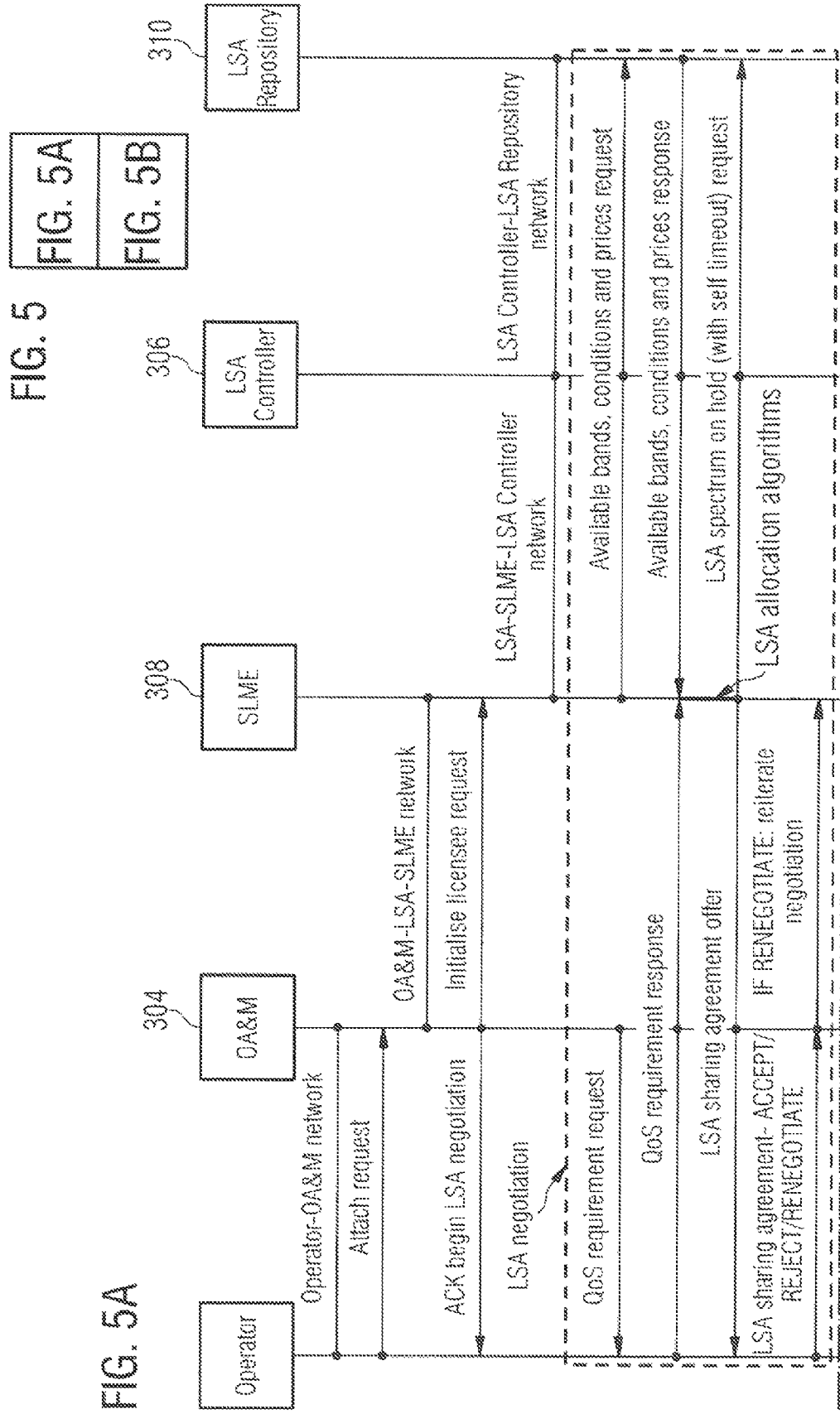

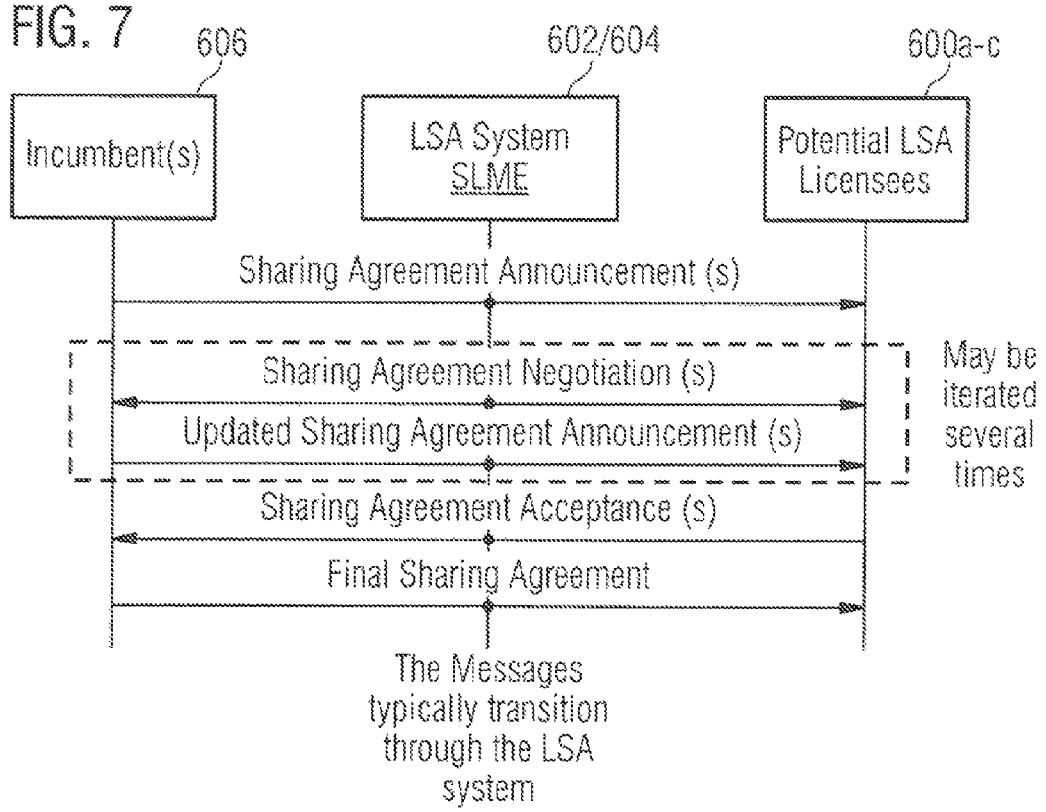
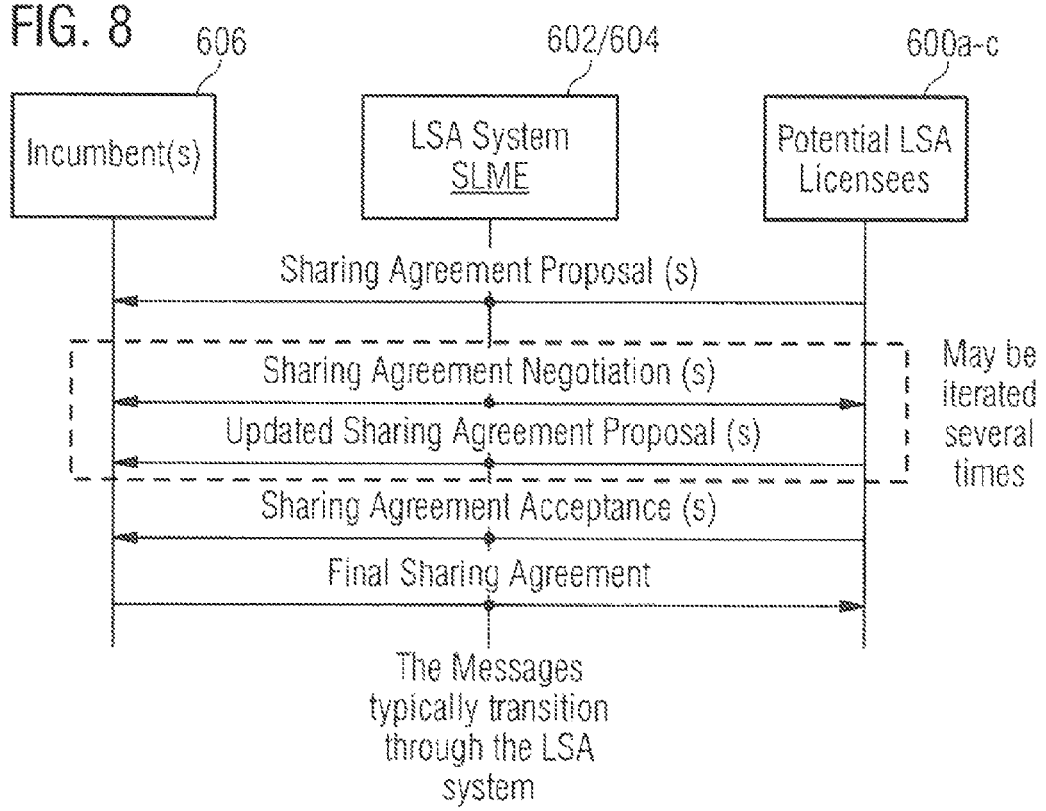

METHODS AND DEVICES FOR SHARED SPECTRUM ALLOCATION

CROSS-REFERENCE TO RELATED APPLICATIONS

This application is a national stage entry according to 35 U.S.C. 371 of WIPO Patent Application PCT/US2016/040619, which was filed Jul. 1, 2016, and is incorporated herein by reference in its entirety.

TECHNICAL FIELD

Various embodiments relate generally to methods and devices for shared spectrum allocation.

BACKGROUND

Recent developments in radio frequency licensing such as spectrum sharing have introduced new possibilities for Mobile Network Operators (MNOs). In particular, proposed spectrum sharing schemes such as Licensed Spectrum Access (LSA, proposed mainly for Europe in the 2.3-2.4 GHz bands) and Spectrum Access System (SAS, proposed mainly in the U.S. for the 3.55-3.7 bands) may open up access to previously restricted wireless frequency bands for mobile communications by allowing MNOs to share certain spectrum bands with "incumbent" users.

Shared spectrum licensees may thus need to agree on a 'sharing agreement' that defines the terms and conditions of access to shared spectrum. Such sharing agreements may specify a variety of important parameters such as the bandwidth, agreement duration, incumbent reclaim conditions, maximum interference and transmit power levels, etc.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows a message sequence chart depicting a sharing agreement announcement procedure;

FIG. 8 shows a message sequence chart depicting a sharing agreement proposal procedure;

DESCRIPTION

Figure 1:
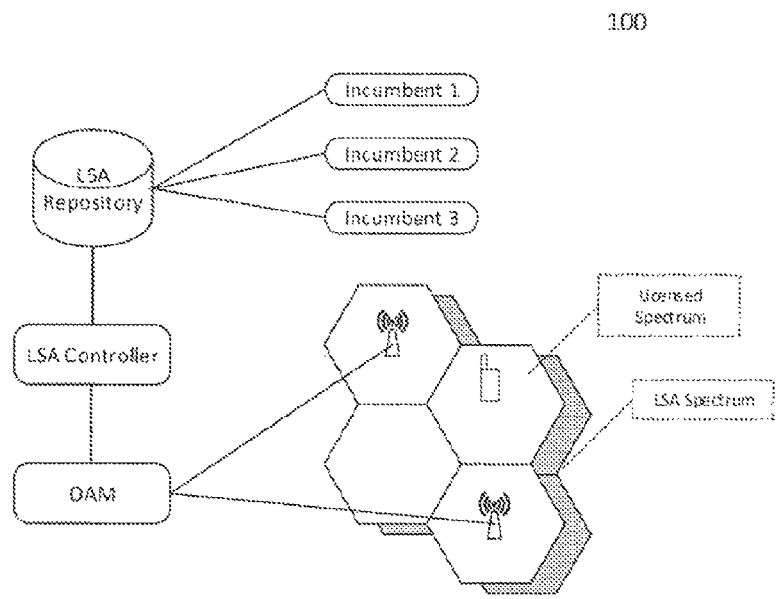
FIG. 1 shows an LSA network architecture.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

The following description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), etc. The examples provided herein are thus understood as being applicable to various other mobile communication technologies, both existing and not yet formulated, particularly in cases where such mobile communication.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

In spectrum sharing schemes such as Licensed Spectrum Access (LSA, proposed mainly for Europe in the 2.3-2.4 GHz bands) and Spectrum Access System (SAS, proposed mainly in the U.S. for the 3.55-3.7 bands), Mobile Network Operators (MNOs) may be granted access to previously restricted radio frequency bands. Accordingly, an SAS or LSA "licensee" may license certain targeted frequency bands from "incumbents", and thus may be able to utilize the shared frequency bands. Licensees may be characterized as lower-tiered users, while incumbents may be characterized as higher-tiered users. Additionally, licensees such as GAA users may be characterized as lower-tiered users relative to PAL users.

While the targeted frequency bands for LSA and SAS may already be officially licensed and/or owned by the incumbents (mainly related to government use), the targeted frequency bands may be under-utilized over time and/or space. For example, the incumbents may utilize the targeted frequency bands relatively rarely, and/or may employ the targeted frequency bands only in certain areas. Accordingly, LSA and SAS propose a system in which the targeted frequency bands may be made available to cellular MNOs in scenarios (both geographically and temporally dependent) where the incumbent is not occupying the band. For example, one or more licensed MNOs may be granted access to the targeted frequency bands in scenarios where the incumbent is not actively occupying the targeted frequency bands, and accordingly may utilize the newly available bandwidth for mobile communications.

As indicated above, LSA has identified the 2.3-2.4 GHz frequency band (corresponding to 3GPP LTE Band 40) as a suitable candidate for spectrum sharing, and has additionally been the focus of proposals to also incorporate the 700 MHz and/or 3.6-3.8 GHz bands. Under the proposed LSA framework, a licensee (e.g. an MNO or any other entity that operates a wireless network) may operate a 3GPP LTE network on licensed shared basis, where a licensee may engage in a multi-year sharing contract with an incumbent (such as e.g. 10 years or more). As incumbents maintain prioritized access of the targeted LSA band over all licensees, any licensee may be required to vacate the targeted LSA band for a given geographic area, given frequency range, and given period of time during which an incumbent is accessing the targeted LSA band.

FIG. 1 shows block diagram 100 illustrating an LSA network architecture. As shown in FIG. 1, LSA spectrum management may rely on a centralized LSA Repository. Incumbents may be required to provide a-priori usage information to the database on the availability of LSA spectrum on a time- and geographic-basis. Depending on the indicated usage information, an LSA controller may employ control mechanisms to grant/deny spectrum access to various licensed incumbents and issue commands to vacate concerned bands. In the current proposed operational approach for LSA, sensing mechanisms may not be required to support the system for identification of incumbent operation. Accordingly, in many cases users may not need to perform sensing to detect incumbent usage; however, this may potentially be adapted in future proposals.

The LSA repository may be a centralized entity that falls outside of the domain of the MNOs and may interface with the various incumbent users. In the context of LSA, such incumbent users may include wireless cameras (which are allocated spectrum in the targeted LSA band in Europe). Each LSA controller (where each MNO network may include one or more LSA controllers) may thus interface with the LSA repository in order to access the a-priori information provided by the various incumbent users. As shown in FIG. 1, an LSA controller may interface with the Operations, Administration, and Management (OAM) framework of the MNO in order to provide information on the availability of the shared spectrum to the relevant MNO network components including base stations and end user terminals.

Similarly to LSA, proposed SAS arrangements may allow licensees to operate a 3GPP LTE network on the 3.55-3.7 GHz frequency band on a shared basis with an incumbent. However, as opposed to the two-tier system between incumbent and licensee (tier-2 and tier-2, respectively) in LSA, SAS additionally proposes a third tier (tier-3) composed of General Authorized Access (GAA) users. In this three-tier system, tier-2 users, or "Priority Access License" (PAL) users, may only be allocated a limited portion of the entire SAS band (e.g. the PAL spectrum with to 70 MHz bandwidth) in the absence of an incumbent. The remaining spectrum, in addition to any unused portions of the PAL spectrum, may be allotted to GAA users which may typically employ the available tier-3 spectrum for LTE Licensed Assisted Access (LSA) or WiFi-type systems.

Figure 2:
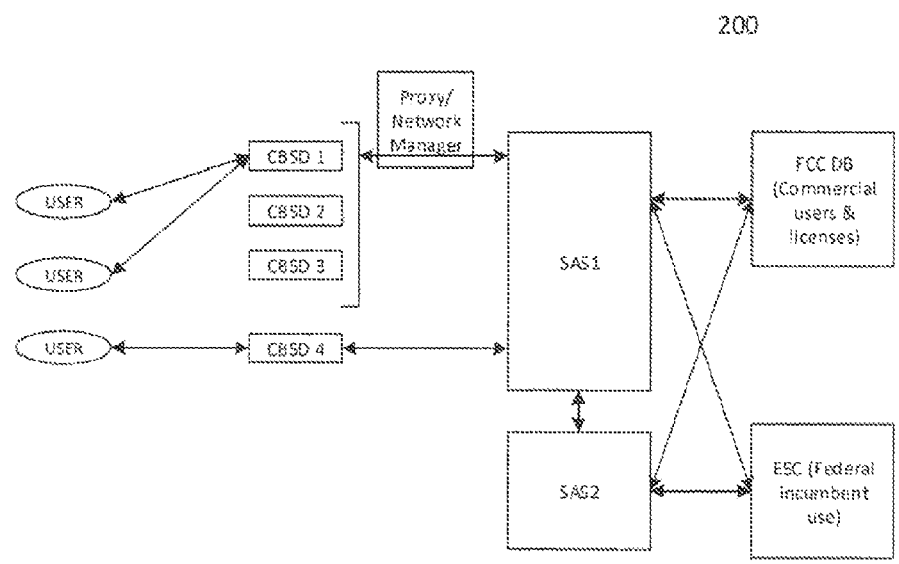
FIG. 2 shows a SAS network architecture.

FIG. 2 shows block diagram 200 illustrating an SAS network architecture. In contrast to LSA, SAS may be designed to ensure coexistence between incumbent users that are not able to provide any a-priori information to a centralized database. As indicated above, SAS may employ a three-tiered system composed of incumbents (tier-1), PAL users (tier-2), and GAA users (tier-3). SAS incumbent users may thus be the highest tier and may generally be protected from interference from the lower-tier PAL and GAA users. Such SAS incumbent users may conventionally be federal or military related, such as Department of Defense (DoD) radars, and may also include other wireless systems such as Fixed Satellite Service (FSS) stations and certain grandfathered terrestrial wireless systems. PAL users (which may include MNOs) may license 10 MHz bands in certain geographic areas (census tracts) and may receive interference protection from GAA users while accepting certain levels of interference from incumbent users. As incumbents are expected to be protected from interference from all lower-tier users, PAL users may be required to vacate the licensed band in certain scenarios where incumbent users wish to utilize the licensed band (where the specifics and frequency of such scenarios may depend on the particulars of each license). As the lowest-tier (tier-3), GAA users may not receive any interference protection (thus accepting interference from both PAL and incumbent users) and may similarly face vacation scenarios in order to protect incumbent users.

As shown in FIG. 2, SAS systems may additionally include an Environmental Sensing Capability (ESC) entity, which may be employed in order to protect incumbent users from interference from PAL and GAA users. Such ESC entities may be composed of a sensor network to detect radio activity by incumbent users, such as e.g. detecting radio activity by military radar, which may allow an SAS entity to instruct PAL and GAA users to cease transmissions on the shared spectrum and/or re-allocate transmission to a different portion of the shared spectrum in order to protect active incumbents.

Accordingly, SAS networks may include one or more SAS entities (e.g. SAS1 and SAS2 as shown in FIG. 2) which may interact with licensee users (GAA and PAL) in order to facilitate spectrum sharing while guaranteeing interference protection to higher-tiered users from lower-tiered users. Each SAS entity thus interact with the network architectures of the licensee users. As shown in FIG. 2, a SAS entity may interact with a single licensee transmitter (e.g. CBSD4) or with a network of licensee transmitters (e.g. CBSD1-CBSD3) via a proxy/network manager entity, which may act as an interface between a SAS entity and the various network components of a given MNO's network. Each network transmitter, e.g. a base station or small cell which are referred to as Citizens Broadband Radio Service Devices (CBSD) in the context of SAS, may thus be able to transmit wireless signals to end users (shown in FIG. 2) according to the shared spectrum access permitted by the corresponding SAS entity. SAS entities may aim to ensure that both the CBSDs (such as e.g. base stations and small cells) and end users (e.g. mobile terminals) do not cause excessive interference to incumbent users, which the SAS framework may enforce by specifying certain maximum permitted transmit power levels for CBSDs and end user terminals.

Both LSA and SAS may additionally provide Quality of Service (QOS) guarantees to licensees, where a licensee that is granted access to a particular frequency band may be guaranteed a certain QOS level. LSA and SAS also resolve congestion problems through central coordination, such as preventing over-utilization of the targeted frequency bands by incumbents and/or other MNOs at a given time at a central control entity. As previously detailed regarding FIGS. 1 and 2, LSA and SAS systems may employ an LSA controller and SAS entity, respectively, to coordinate access between incumbents and secondary users (e.g. registered licensees). Accordingly, these central control entities may grant secondary users access to LSA and SAS spectrum, which may be on an exclusive basis. Secondary users may therefore enjoy dedicated access to the additional spectrum available through LSA and SAS for a given period of time and in a given geographic area.

As access to LSA and SAS spectrum may be situation-dependent (i.e. time and geographic dependent), shared spectrum may be appropriate for use in a "supplemental" role. For example, given the variable availability of shared spectrum, it may be impractical (albeit possible) in many scenarios to realize a comprehensive wireless network entirely on shared spectrum. However, licensee MNOs may be able to utilize dedicated licensed spectrum (i.e. exclusively licensed by a licensee) in a primary role while allocating shared spectrum for supplemental uplink and/or downlink. Licensee MNOs may thus be able to rely on the constant availability of dedicated licensed spectrum while utilizing shared spectrum to increase bandwidth when the shared spectrum is available.

Accordingly, shared spectrum may be useful in carrier aggregation schemes, which may commonly have a "primary" carrier and one or more "secondary" carriers. Accordingly, licensees may use shared spectrum for secondary carriers to complement the primary carriers composed of dedicated licensed spectrum. Licensees may employ shared spectrum in this manner in either a supplemental downlink (SDL) or supplemental uplink (SUL) role, and may even be able to adjust the relative balance of shared spectrum for SDL and SUL, such as by allocating a greater number of either uplink frames or downlink frames in a Time Division Duplexing (TDD) system or by allocating more of the shared spectrum bandwidth to either uplink or downlink in a Frequency Division Duplexing (FDD) system.

Many of the bands identified by the proposed LSA and SAS systems for European and American systems are employed in other regions as TDD bands for Third Generation Partnership Project (3GPP) networks. Accordingly, many Original Equipment Manufacturers (OEM) may already manufacture handsets configured to utilize the LSA and SAS spectrum for 3GPP TDD networks. Accordingly, it may be relatively straightforward for OEMs to enable manufactured handsets to additionally use the LSA and SAS bands for 3GPP TDD in other regions where the LSA and SAS bands were previously unavailable due to wireless frequency licensing restrictions. Of particular interest may be FDD-TDD carrier aggregation in which a licensee may utilize dedicated licensed spectrum for the FDD carrier and shared licensed spectrum for the TDD carrier. The licensee may thus activate the shared licensed spectrum for the TDD carrier when the licensee is granted access to the shared licensed spectrum in the absence of the incumbent.

Licensees in both LSA and SAS schemes may need to agree on a contract known as a "sharing agreement" with incumbent operators. Each sharing agreement may specifically define the terms of access that a licensee is entitled to, such as the geographic area, duration, frequency range, transmit power and interference thresholds, incumbent spectrum reclaim rates, pricing, etc. Accordingly, each licensee that wishes to access shared spectrum may need to reach a sharing agreement with the incumbents (or an entity representing interests of the incumbents, such as the FCC) and may subsequently only access the shared spectrum according to the terms defined by the sharing agreement.

For example, a licensee may negotiate a sharing agreement to utilize a specific shared spectrum band for a given census tract, which may define a geographical area that the licensee is permitted to utilize the shared spectrum. The sharing agreement may specify an agreed duration of time in which the licensee is entitled to utilize the shared spectrum, which may be defined in a number of years, weeks, days, hours, minutes, etc. As licensees operating in shared spectrum schemes may need to ensure that incumbents do not suffer from interference, the sharing agreement may also specify maximum transmit power and/or interference thresholds. Licensees may thus not be permitted to transmit above the specified maximum transmit power and may also need to include interference sensing elements capable of monitoring interference to ensure that interference remains within the agree levels. The incumbent spectrum reclaim rate may define a rate at which the incumbent can reclaim the spectrum. Accordingly, if the incumbent spectrum reclaim rate is e.g. 10%, the licensee can expect to have free access to the shared spectrum 90% of the time while needing to vacate the spectrum for incumbents no more than 10% of the time.

The sharing agreement may also be agreed at a given price, which may be variable depending on the terms of the sharing agreement. For example, sharing agreements for larger or more densely populated areas, sharing agreements for long durations, sharing agreements with high maximum transit power levels and high interference thresholds, and sharing agreements with low incumbent spectrum reclaim rates may demand a higher price than contrasting sharing agreements. Accordingly, licensees may need to evaluate the value of sharing agreements based on the terms of the sharing agreement in order to decide on an agreeable price.

In accordance with this disclosure, it is recognized that advances in shared spectrum systems may result in a very dynamic system that potentially involves many short-duration sharing agreements. For example, licensees may wish to obtain sharing agreements only for short durations of time, such as a single-day sharing agreement that covers a census tract containing a sports arena in order to support higher expected traffic during sporting events. Accordingly, a licensee may purchase such sharing agreements in order to obtain more spectrum to supplement exclusively licensed spectrum during expected high traffic periods. Such may be an economical decision for licensees as expensive exclusive spectrum licensing may be avoided.

Additionally, due to the dynamic environment of radio communication networks, it is recognized that licensees may wish to render informed and up-to-date decisions on what sharing agreements should be pursued. If sharing agreements are dynamic and short-duration, the interference situation in shared bands may vary frequently in time, thus yielding fast-changing radio conditions. Accordingly, this disclosure recognizes the advantage in shaping sharing agreement negotiations based on active sensing of interference and radio conditions.

Given the dynamic nature of shared spectrum networks and the potentially short-duration agreement times, there may be many different sharing agreement options that licensees and incumbents may wish to pursue. Accordingly, different licensees may have a wide range of conditions (geographic area, spectrum bandwidth, agreement duration, radio conditions, etc.) that are important in potential sharing agreements while incumbents may similarly have a range of conditions that they are available to offer in licensing shared spectrum. Accordingly, an advantageous shared spectrum network management technique may provide a sharing level management entity (SLME) that is capable of receiving conditions from licensees, receiving conditions from incumbents, and generating proposed sharing agreements that match licensees to incumbents based on the conditions offered by both sides. In determining appropriate sharing agreements, the SLME may also consider radio conditions such as the interference that would arise from each proposed sharing agreement. Furthermore, the SLME may utilize active radio sensing in order to evaluate current radio conditions in deciding which sharing agreements would best support radio communications with minimal interference. The SLME may thus be responsible for identifying, proposing, and adapting sharing agreements that will provide minimum interference and allow for licensee transmitters to transmit with maximum possible transmit power. By focusing sharing agreement procurement on such targets, licensee networks may be able to dynamically agree on dynamic and short-duration sharing agreements while avoiding poor shared spectrum radio conditions associated with excessive interference and low transmit power.

Figure 3:
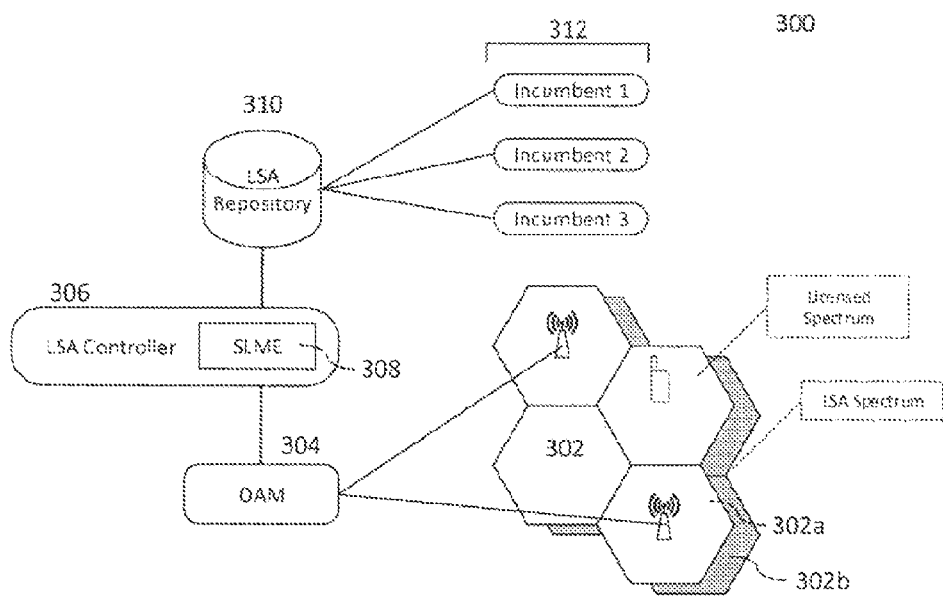
FIG. 3 shows an SLME location within an LSA network architecture.
Figure 4:
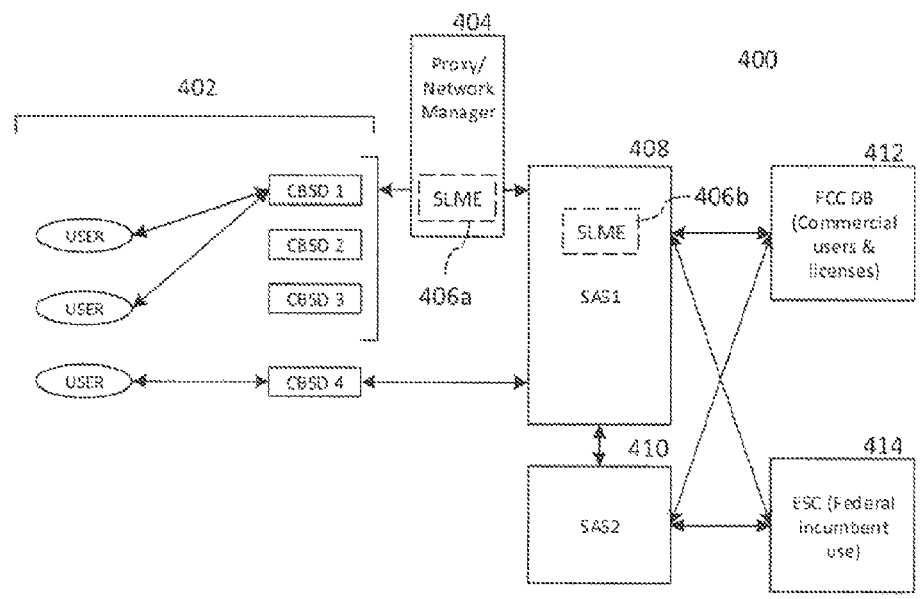
FIG. 4 shows an SLME location within a SAS network architecture.

FIGS. 3 and 4 show exemplary placement of the SLME within an LSA and SAS system, respectively. As shown in FIG. 3, LSA network 300 may include radio access network 302, which may be composed of licensed spectrum 302a and shared spectrum 302b. Radio access network 300 may include one or more network transmitters (such as base stations) and terminal devices (such as mobile phones), which may operate on one or both of licensed spectrum 302a and shared spectrum 302b. Although not explicitly shown in FIG. 3, radio access network 300 may also interface with a core network.

Operations, Administration, and Maintenance (OAM) entity 304 may be responsible for Element Management Systems (EMS) and Network Management Systems (NMS), which may depend on the system architecture and hardware utilized by the operator of radio access network 302. OAM entity 304 may allow for the operator of radio access network 302 to manage the various hardware components of radio access network 302, which may be provided by different vendors. In relation to the sharing level management entity of this disclosure, OAM 304 may allow the operator to control operation of the various devices (including base stations) of radio access network 302.

As introduced above regarding LSA systems, LSA controller 306, OAM 304, and radio access network 302 may all be included within a single operator's network while LSA repository 310 and incumbents 312 may be external to the operator network (and may additionally be interfaced with other operator networks, not explicitly shown in FIG. 3). LSA controller 306 may thus act as an interface between the operator network and LSA repository 310, and thus may serve as the communication point at which sharing level management entity (SLME) 308 may procure sharing agreements for the operator to access shared spectrum 302b.

Accordingly, SLME 308 may act as a controller responsible for identifying and obtaining desirable sharing agreements for the operator's network, which may allow the operator to utilize shared spectrum 302b. SLME 308 may thus act as an automated control entity, which may be controlled to a limited degree by an operator representative via OAM 304 and may negotiate sharing agreements with LSA repository 310. As LSA controller 306 may conventionally act as the communication point between an operator network and LSA repository 310, SLME 308 is positioned in FIG. 3 as part of LSA controller 306; however, SLME 308 may be included as a separate entity from LSA controller 306 that retains access to both the operator (via OAM 304 or another path) and LSA repository 310.

As further detailed below, SLME 308 may be configured to procure sharing agreements that are dynamic, i.e. that are relatively short in duration, and may further be configured to identify advantageous sharing agreements based on radio communication targets such as interference conditions and permissible transmit powers. Accordingly, SLME 308 may be configured to generate, propose, and modify sharing agreements based on monitored radio conditions, such as interference and radio sensing obtained by network sensing elements of radio access network 302 (not explicitly shown in FIG. 3). NM 308 may thus able to pursue sharing agreements based on up-to-date radio conditions, which may allow the operator to enjoy shared spectrum access that is not disrupted by interference and not limited by restrictive maximum transmit power limitations.

FIG. 4 shows an alternative exemplary deployment of the SLME in SAS network 400. As previously noted, SAS architectures may differ from LSA architectures in that the SAS entities (the main control entities) may be located outside of the operator domain. As SAS schemes must be more reactive due to the dynamicity of incumbent usage (e.g. military/shipborne radar for SAS as compared to wireless cameras for LSA), an operator-external deployment of SAS entities may allow the SAS entities to closely interface between incumbents and licensees.

Accordingly, the SLME of SAS network 400 may be either deployed as part of SAS entity (external to the operator, e.g. SAS entity 408) or as part of the proxy/network manager 404 (internal to the operator). Other deployment options are additionally within the scope of this disclosure, such as at a location external to both proxy/network manager 404 and SAS entity 408.

SLME 406a/406b may function similarly as detailed regarding SLME 308 in LSA network 300; namely, SLME 406a/406b may act as an interface between operators and incumbents in order to dynamically negotiate for sharing agreements. Accordingly, SLME 406a may negotiate for sharing agreements for an operator of radio access network 402 (similarly including terminal devices and network transmitters) with incumbents (at FCC DB 412) via SAS entity 408. Alternatively, SLME 406b may be located in SAS entity 408, thus providing a more direct path to incumbents at the expense of being located external to the operator's network.

Regardless of the specific deployment, SLME 406a/406b may similarly be configured to dynamically identify, obtain, and adapt advantageous sharing agreements for the operator of radio access network 402, which may include identifying sharing agreements based on radio environment estimates and/or radio sensing. As SAS network 400 additionally includes ESC 414 tasked with interference sensing, SLME 406a/406b may be configured to obtain the interference and radio sensing measurements via ESC 414. Alternatively, 406a/406b may be configured to obtain the interference and radio sensing measurements via sensing elements of radio access network 402 (not explicitly depicted in FIG. 4).

While SLME deployment is specifically identified in FIGS. 3 and 4 for LSA and SAS contexts, the appropriate SLME location may change depending on the specific network architecture, such as for updated LSA or SAS architectures or for next-generation spectrum sharing schemes. Accordingly, various different deployments of the SLME are within the scope of this disclosure; nevertheless, it is emphasized that the SLME may be advantageously placed at an interface point between one or more operators and incumbents in order to allow for the SLME to dynamically procure and adapt sharing agreements.

Furthermore, while FIGS. 3 and 4 depict only a single operator, the SLME may be shared between multiple operators in order to allow multiple different operators to negotiate for sharing agreements. For example, for an operator-external deployment, such as for SLME 406b of SAS network 400, SLME 406b may interface with multiple different operators (configured analogously to proxy/network manager 404 and radio access network 102) in order to negotiate sharing agreements for each of the different operators. Such may not necessarily require that the SLME be operator-external; for example, the SLME maybe operator-internal, such as for SLME 308 and SLME 406b, and may thus be provided by a single operator but shared with other operators via an interface to the other operators.

Accordingly, SLME 308/406a/406b may be structurally realized as a processor configured to execute software logic that direct the identification, procurement, and adaptation of sharing agreements. Accordingly, SLME 308/406a/406b may additionally include a non-transitory computer readable medium configured to hold the software logic, which the processor may retrieve and execute to control the operation of SLME 308/406a/406b. SLME 308/406a/406b may identify desirable sharing agreements (potentially based on interference and radio conditions and other communication targets) according to the software logic and proceed to propose and adapt sharing agreements with input from licensees and incumbents under the control of the software logic to obtain sharing agreements. SLME 308/406a/406b may thus have authority to both propose, modify, and adapt sharing agreements during negotiation with the incumbents.

Figure 5B:
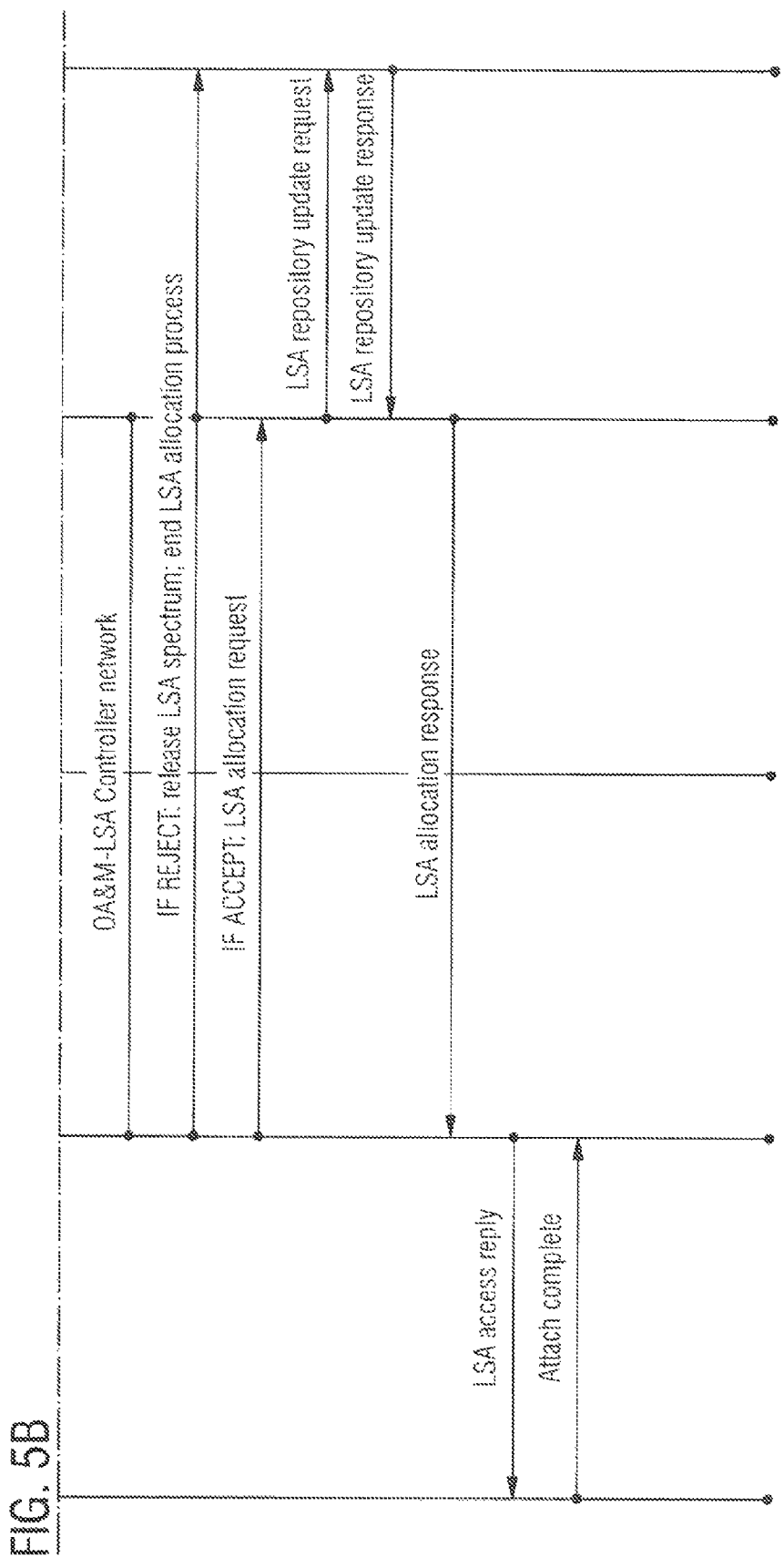
FIG. 5 shows a message sequence chart depicting a spectrum allocation procedure (including top portion 5A and bottom portion 5B)

FIG. 5 shows a message sequence chart (including top portion 5A and bottom portion 5B) that illustrates an exemplary spectrum allocation process performed by SLME 308, where SLME 308 may be configured to generate, propose, and adapt sharing agreements between an operator and an incumbent via LSA repository 310. As shown in FIG. 5, the operator (e.g. a representative of the operator with authority to initiate spectrum allocation) may transmit an attach request to OAM 304, which may express the operator's interest in accessing LSA spectrum and may signal initiation of the sharing agreement procurement process. The attach request may or may not contain any specific requirements.

OAM 304 may then forward the attach request to the SLME 308, which may cross into the LSA system domain. SLME 308 may accept or reject the attach request; for example, the SLME 308 may authenticate the operator and verify that the operator is not blacklisted before accepting the attach request and rejecting the attach request otherwise.

If the operator is authenticated, OAM 304 may transmit an ACK begin LSA negotiation to the operator, thus signaling that LSA spectrum allocations have been initiated. OAM 304 may then initialize a licensee request with SLME 308 to begin the LSA spectrum allocation. As the spectrum allocation process may include several 'rounds' of re-proposals, OAM 304 may also initialize a counter to track the number of negotiation iterations.

SLME 308 may then execute the sharing agreement negotiation according to the control logic defined the associated program code. Accordingly, SLME 308 may query LSA repository 310 (via LSA controller 306) for the LSA bands available for allocation in addition to conditions attached to the available LSA bands by the concerned incumbents. More specifically, SLME 308 may send a request for available bands, conditions, and prices, which may request the specific LSA bands that are available, the incumbent's asking price, and other relevant conditions of access such as incumbent reclaim conditions, maximum permitted interference and transmit power thresholds, etc. LSA repository 310 may thus represent one or more incumbents, and accordingly may provide conditions for each of the incumbents.

In order to obtain further operator input for the negotiation process, OAM 304 may then request Quality of Service (QoS) requirements from the operator, which may include the access conditions that the operator is seeking. For example, the operator may have certain requirements including, etc., which the operator may treat as a prerequisite for an acceptable sharing agreement.

Concurrently, LSA repository 310 may respond to the available bands, conditions, and prices request, which may contain the queried information that details the available spectrum that the incumbents can offer for lease. The operator may simultaneously provide the QoS requirement response, thus providing SLME 308 with the requirements from the operator and the available offerings by the incumbents, which may form the basis of the negotiations by SLME 308.

Accordingly, SLME 308 may be configured to evaluate the requirements of the operator against the offerings of the incumbent to identity advantageous sharing agreements, i.e. sharing agreements that meet the conditions of both sides. SLME 308 may thus be able to identify an availability offered by an incumbent LSA repository 310 that meets the requirements of the operator, which SLME 308 may then offer as a proposed sharing agreement to the operator. As there may be many different conditions specified by both incumbents and operators, SLME 308 may be configured to consider many different possible sharing agreements before settling on one (or more) sharing agreements to propose to the operator. SLME 308 may be configured to evaluate each possible sharing agreement according to control logic programmed into SLME 308, which may consider the conditions specified by both sides.

The proposed sharing agreement may contain the LSA band (or bands) being offered, the price, and conditions of access (duration, masks, reclaim parameters, etc.). SLME 308 may additionally transmit a hold request to LSA repository 310 for the spectrum related to the proposed sharing agreement, in response to which LSA repository 310 may hold the proposed spectrum for a timeout period. If the operator does not agree to the proposed sharing agreement within the timeout period (e.g. due to non-agreement or excessively slow reaction), LSA repository 310 may release the hold on the proposed spectrum, thus making the proposed spectrum eligible for lease in other sharing agreements (e.g. by other operators).

The operator (or a representative of the operator) may then accept, reject, or renegotiate the proposed sharing agreement. If the operator rejects the proposed sharing agreement, OAM 304 may notify LSA controller 306 of the rejection, which may forward the rejection to LSA repository 310. LSA repository 310 may then release the LSA spectrum (ending the timeout period) and end the current LSA allocation process. The LSA spectrum targeted in the proposed sharing agreement may thus be released from the hold and thus become available for licensing in other sharing agreements.

A rejection by the operator may signify that the operator does not have any remaining interest in the available LSA spectrum. However, if the operator still has interest in alternative LSA spectrum and/or other agreement conditions, the operator may select to renegotiate for another sharing agreement. Accordingly, if the operator decides to renegotiate the proposed sharing agreement, OAM 304 may indicate to SLME 308 that negotiations should be re-iterated. The renegotiation process may thus re-start with OAM 304 again querying the operator for updated QoS requirements. As the operator declined the initially proposed sharing agreement, this may prompt operator to adjust the QoS requirements depending on which aspects of the proposed sharing agreement were unsatisfactory the operator. SLME 308 may concurrently query LSA repository 310 for available bands, conditions, and prices, which may be dynamic and thus may have changed from the first negotiation iteration.

OAM 304 may then forward the updated QoS requirements to SLME 308 which may also receive the available bands, conditions, and prices response from LSA repository 310. SLME 308 may either utilize the same control logic applied during the first negotiation iteration or, given the rejection by the operator, may adapt the control logic in order to improve the likelihood that an acceptable sharing agreement will be proposed. SLME 308 may then propose another LSA sharing agreement to the operator based on the updated conditions and QoS requirements, which may similarly prompt an LSA spectrum hold at LSA repository 310 and a subsequent acceptance, rejection, or renegotiation response by the operator. The renegotiation procedure may continue to iterate in this fashion until either the operator accepts a proposed sharing agreement with a sharing agreement accept message or until the negotiation iteration count reaches a predefined threshold (whichever occurs first). The LSA spectrum negotiation process may subsequently terminate after either condition is reached.

If the operator accepts a proposed sharing agreement, the operator will in effect accept all conditions of access defined in the proposed sharing agreement and proceeds with spectrum allocation. Accordingly, OAM 304 may notify LSA controller 306 of the operator's acceptance of the proposed sharing agreement by transmitting an LSA allocation request, which may prompt LSA controller 306 to proceed with allocation procedures in order to provide the agreed-upon LSA spectrum to the operator for access. As shown in FIG. 5, LSA controller 306 may send an LSA repository update request to LSA repository 310 in order to lock the concerned LSA spectrum to the operator. LSA repository 310 may then respond with an LSA repository update response to LSA controller 306, which may confirm the lock on the concerned LSA spectrum. LSA controller 306 may then provide an LSA allocation response to OAM 304, which may forward the acceptance to the operator in the form of an LSA access reply. The operator may conclude the process by providing an attach complete message to OAM 304.

As OAM 304 interfaces with radio access network 302 of the operator, OAM 304 may oversee the access to the agreed-upon LSA spectrum by radio access network 302. Accordingly, OAM 304 may permit network transmitters and terminal devices of radio access network 302 to access the LSA spectrum, which may include monitoring the access in order to ensure that the sharing agreement conditions are obeyed by the operator. Accordingly, OAM 304 may assume responsibility for ensuring that only the agreed-upon LSA spectrum is accessed for only the agreed-upon time in addition to compliance with other conditions such as incumbent reclaiming and interference and transmit power restrictions.

Although FIG. 5 details the sharing agreement negotiation procedure in an LSA context, this example is demonstrative and may be analogously applied to other spectrum sharing contexts including SAS and other not yet formulated spectrum sharing schemes.

SLME 308 may thus play an essential role in obtaining advantageous sharing agreements for operators. In the event that an operator requests further LSA spectrum for a given geographic location for a given period of time, SLME 308 may typically verify the LSA repository for available LSA spectrum offerings (via the available bands, conditions, and prices request). In proposing LSA sharing agreement offers back to operator, SLME 308 may generate sharing agreements whose conditions meet the operator's requirements at the lowest possible price. Accordingly, in practice this may mean that the operator can have trade-offs between spectrum availability and LSA leasing prices and if the spectrum availability can meet the operator's QoS requirements. SLME 308 may be configured with control logic that can quantitatively evaluate the suitability of possible sharing agreements based on the conditions specified by both the operator and the incumbent. As will be detailed, the operator may provide SLME 308 (or SLME 306a/306b in a SAS context) with technical conditions that may influence the decision of SLME 308 during negotiation, which may prompt SLME 308 to pursue sharing agreements with the goal of minimizing interference, maximizing permitted transmit powers, reducing latency/jitter/loss rates, etc.

As previously noted, SAS and LSA both include provisions that allow for incumbents to reclaim spectrum for certain periods of time. The exact reclaim conditions may be agreed upon in the sharing agreement, such as specifying the incumbent spectrum reclaim rate and/or the maximum reclaim time. For example, incumbents such as Electronic News Gathering (ENG) systems may commonly engage in incumbent spectrum reclaiming. In the event that an incumbent reclaims spectrum for a given period (if allowed by the sharing agreement), SLME 308 may be tasked with identifying alternative LSA spectrum in order to bridge the duration that the licensed LSA spectrum is available. Accordingly, via instruction by the operator SLME 308 may similarly negotiate for temporary or short-term sharing agreements to provide substitute shared spectrum in place of the reclaimed spectrum. Sharing agreements may typically guarantee a high level of availability to the licensee (e.g. between 90-99% availability to the licensee, i.e. <1-10% incumbent spectrum reclaim rates) in the concerned geographic area. Regardless, SLME 308 may still pursue substitute spectrum during the typically short periods of time in which an incumbent reclaims spectrum. The incumbent may not necessarily reclaim all of the licensed spectrum and/or the licensed spectrum in the entire licensed geographic area; accordingly, SLME 308 may only need to negotiation for substitute spectrum in part of the licensed band and/or in part of the licensed geographic area.

Given the potentially dynamic nature of shared spectrum access, SLME 308 may help operators identify low-cost LSA spectrum for short term needs. As these sharing agreements may be low-cost, there may be strong availability constraints on operators. Accordingly, SLME 308 may act as a go-between for licensees and incumbents in order to forward sharing agreement proposals to incumbents at LSA repository 310 to allow incumbents to evaluate proposed sharing agreements to determine if they are good deals are note. For example, in the case of special events (e.g. sports events, Olympics, etc.), operators may conventionally deploy mobile infrastructure equipment (e.g. cells on trucks) for several days or weeks in order to support increased traffic demands. As this mobile infrastructure only requires short-term investment (compared to long-term investment required for 'fixed' base stations), a shared spectrum solution may be very attractive to operators in these scenarios. Accordingly, operators may deploy mobile base stations in the targeted area during the required time and may utilize the services offered by SLME 308 in order to obtain short-term sharing agreements to provide the additional spectrum needed to support traffic for such events. Accordingly, while many current discussions for LSA proposals target longer-term agreement durations (e.g. years or months), a management entity in the form of SLME 308 may prove well-suited for potential expansion into shorter-term agreement durations due to its dynamic ability to perform sharing agreement negotiation.

Other longer-term events, such as for seasonal tourist areas e.g. beaches or mountain resorts, may also prompt operators to pursue agreement durations in the range of weeks or months. Accordingly, operators may wish to deploy mobile infrastructure instead of fixed infrastructure, which may similarly provide a suitable scenario for mobile base station deployment supported by shared spectrum licensed for the duration high-traffic period.

Figure 6:
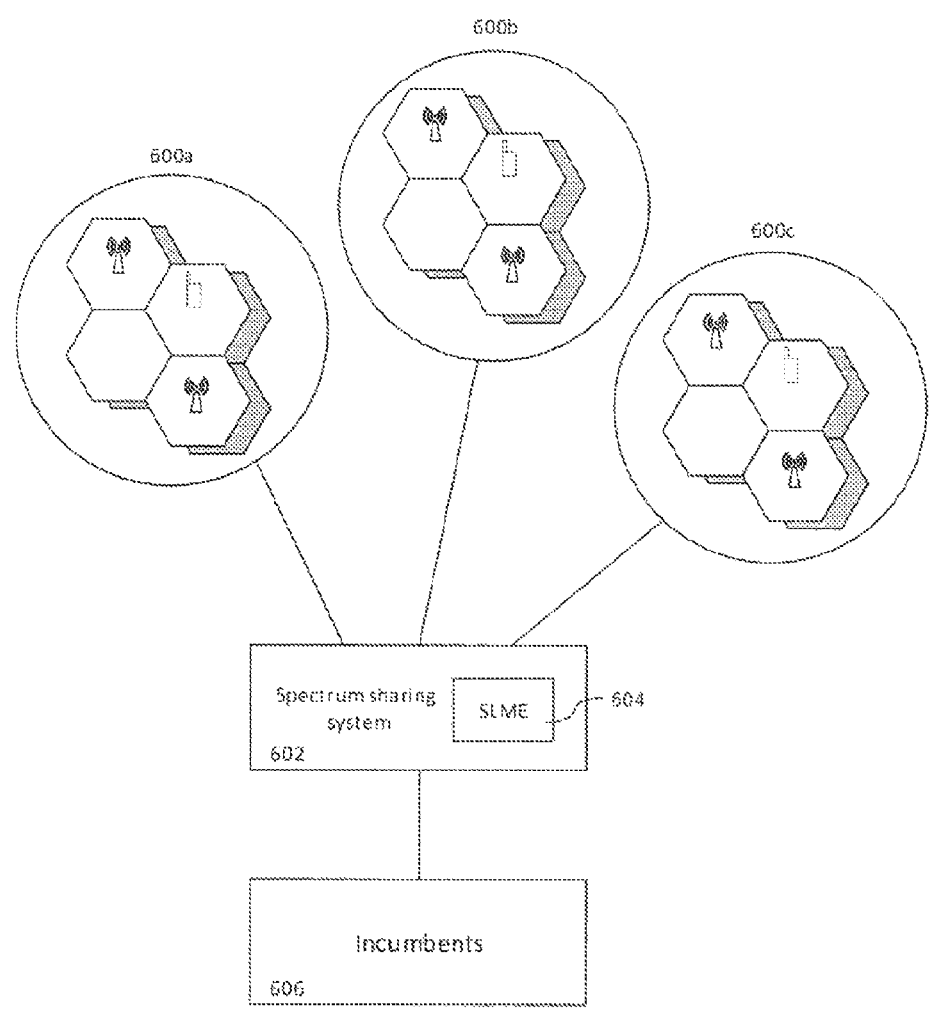
FIG. 6 shows a spectrum sharing network architecture.

FIG. 6 shows a general deployment of SLME 604 within spectrum sharing system 602, which may interface with licensees 600*a*, 600*b*, and 600*c* and incumbents 606 as shown in FIG. 6. Although SLME 604 is shown as being common to each of licensees 600*a*-600*c*, this is exemplary; accordingly, each of licensees 600*a*-600*c* may alternatively each be served by a single SLME of spectrum sharing system 602. It is noted that FIG. 6 is a generalization of both the LSA and SAS contexts of FIGS. 3 and 4; accordingly spectrum sharing system 602 may be any type of spectrum sharing system and SLME 604 may act as part of sharing agreement negotiation in any spectrum sharing context.

As previously detailed regarding FIGS. 3-5, SLME 604 may act as an intermediary between licensees 600*a*-600*c* and incumbents 606 in order to procure sharing agreements for licensees 600*a*-600*c*. SLME 604 may similarly be configured to assist in matching licensees with incumbents to obtain advantageous sharing agreements.

Additionally, as shown in FIGS. 7 and 8, SLME 604 may assume a more active role in sharing agreement negotiations by both managing offers ("announcements") and requests ("proposals") for sharing agreements. As shown in FIG. 7, incumbents 606 may first issue a sharing agreement announcements, which may typically contain a list of usage conditions available for potential licensees 600*a*-*c* to access the shared spectrum being offered by incumbents 606. SLME 604 may forward the sharing agreement announcements to licensees 600*a*-*c*, which may enter into separate sharing agreement negotiations with incumbents 606 via SLME 604. Licensees 600*a*-*c* may thus try to negotiate better usage conditions with the incumbents 606, in response to which incumbents 606 may issues an updated sharing agreement announcements with improved conditions based on the negotiations. As shown in FIG. 6, one or more of licensees 600*a*-*c* may accept the sharing agreements negotiated with incumbents 606 and confirm a final sharing agreement, thus allowing the agreeing licensees to access the licensed shared spectrum according to the terms of the sharing agreements.

Alternatively, as shown in FIG. 8, licensees 600*a*-*c* may originate the sharing agreement proposals. SLME 604 may then forward the sharing agreement proposals to incumbents 606, which may each separately enter into negotiation negotiations with one or more of licensees 600*a*-*c* in order to update and potentially agree on sharing agreements. The agreeing licensees may then provide sharing agreement acceptances, which may be configured by incumbents 606 with final sharing agreements.

In both the processes of FIG. 7 and FIG. 8, SLME 604 may assume an active role in negotiating the terms of the sharing agreements, such as by cross-referencing licensee requirements with proposals provided by the incumbents. Accordingly, SLME 604 may utilize its programmed control logic in order to identify which proposed sharing agreements are best-suited to which incumbents and licensees. Such may utilize an evaluation algorithm programed into SLME 604 that is capable of analyzing which sharing agreements best fit licensee requirements. As previously indicated, sharing agreements may include a relatively large quantity of different fields that each specify the constraints of the agreement; accordingly, licensees may value sharing agreements depending on the exact parameters of each proposed sharing agreement. Some sharing agreements may obviously be better suited to some licensees than others, which SLME 604 may be programmed to evaluate based on the fields defined in each proposal. SLME 604 may thus be able to sort through multiple proposals or announcements in order to identify the best incumbent-licensee matches based on the sharing agreement conditions and licensee requirements.

Figure 9:
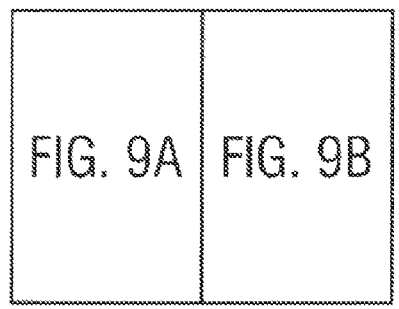
FIG. 9 shows fields and parameters of a sharing agreement announcement (including left-side portion 9A and right-side portion 9B)
Figure 9A:
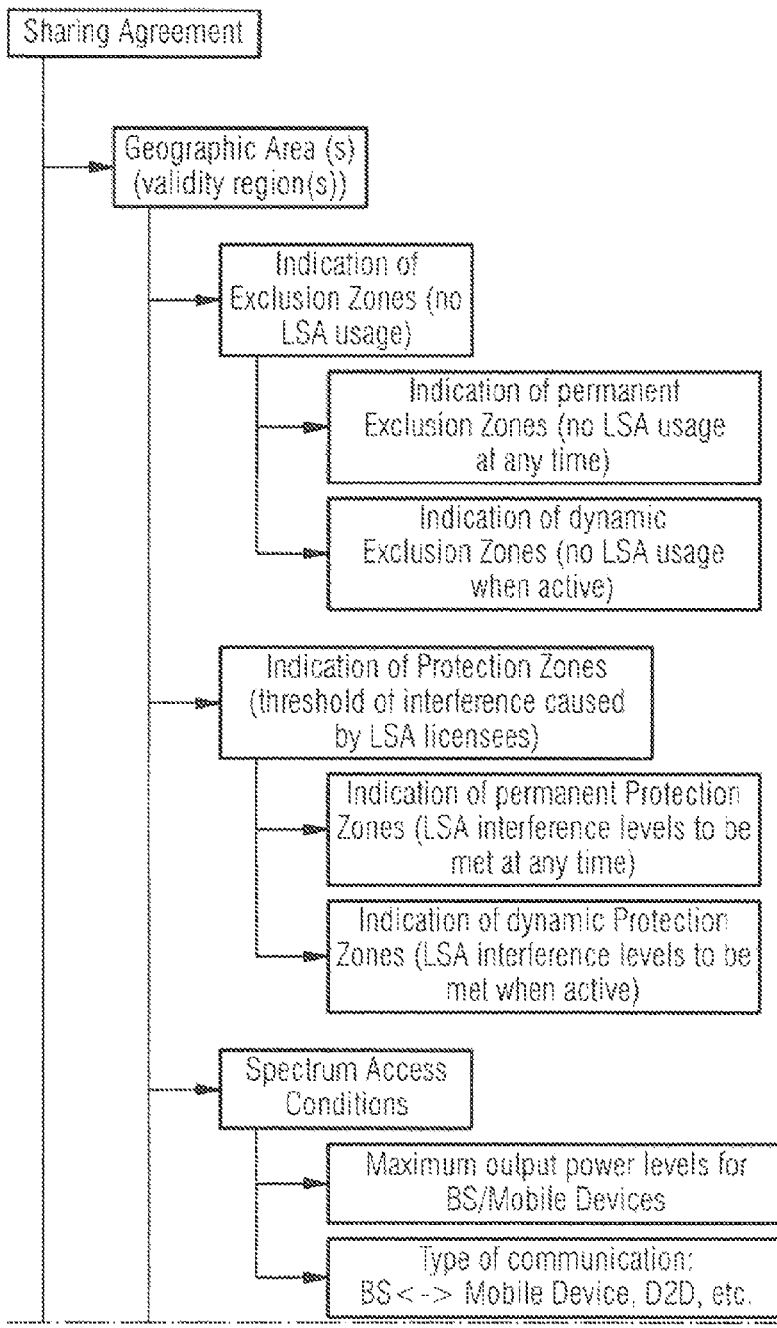
Figure 9B:
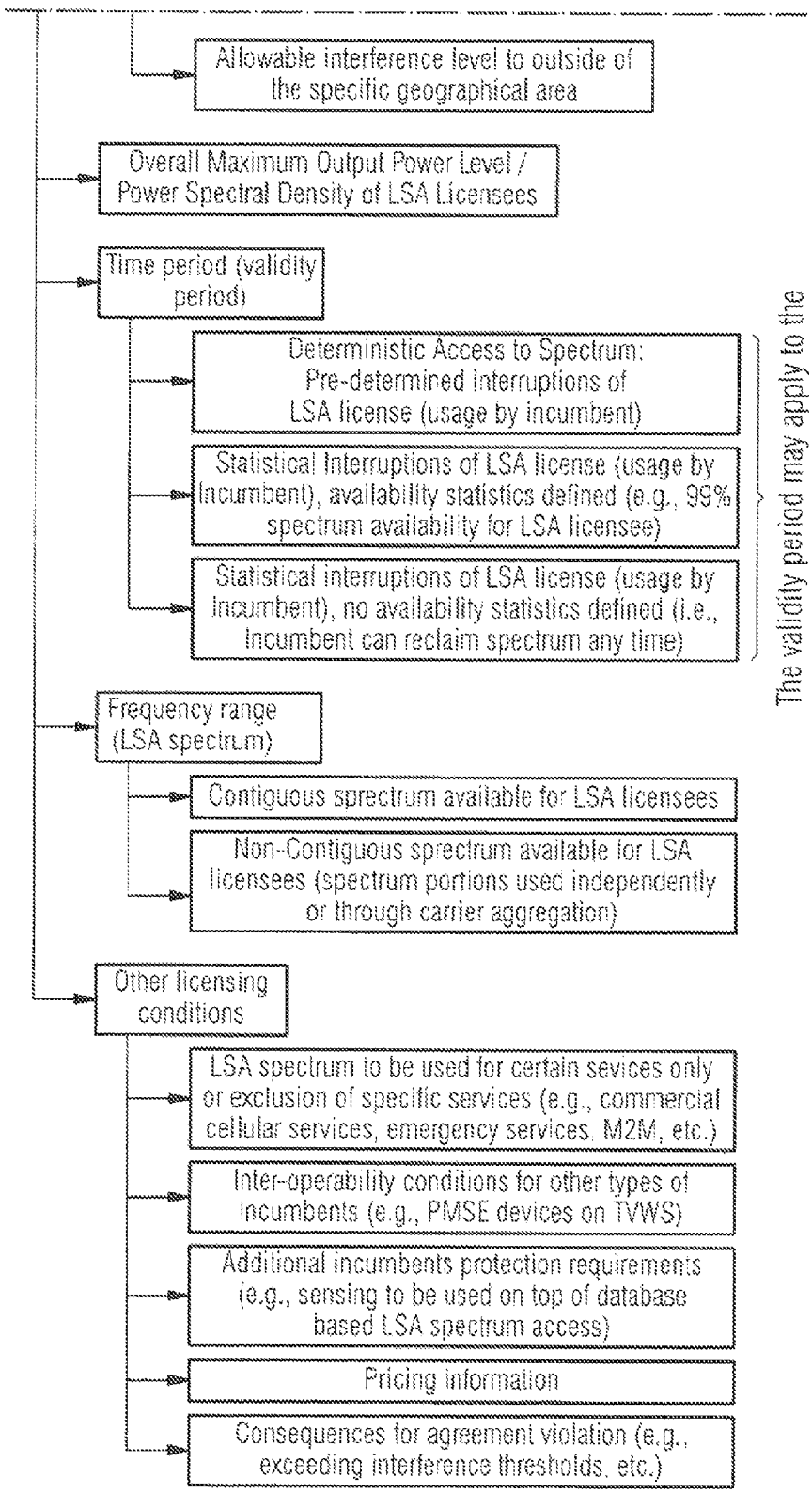
Figure 10:
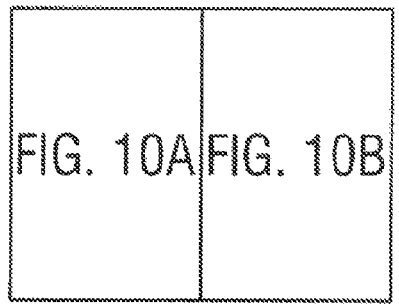
FIG. 10 shows fields and parameters of a sharing agreement (including left-side portion 10A and right-side portion 10B.
Figure 10A:
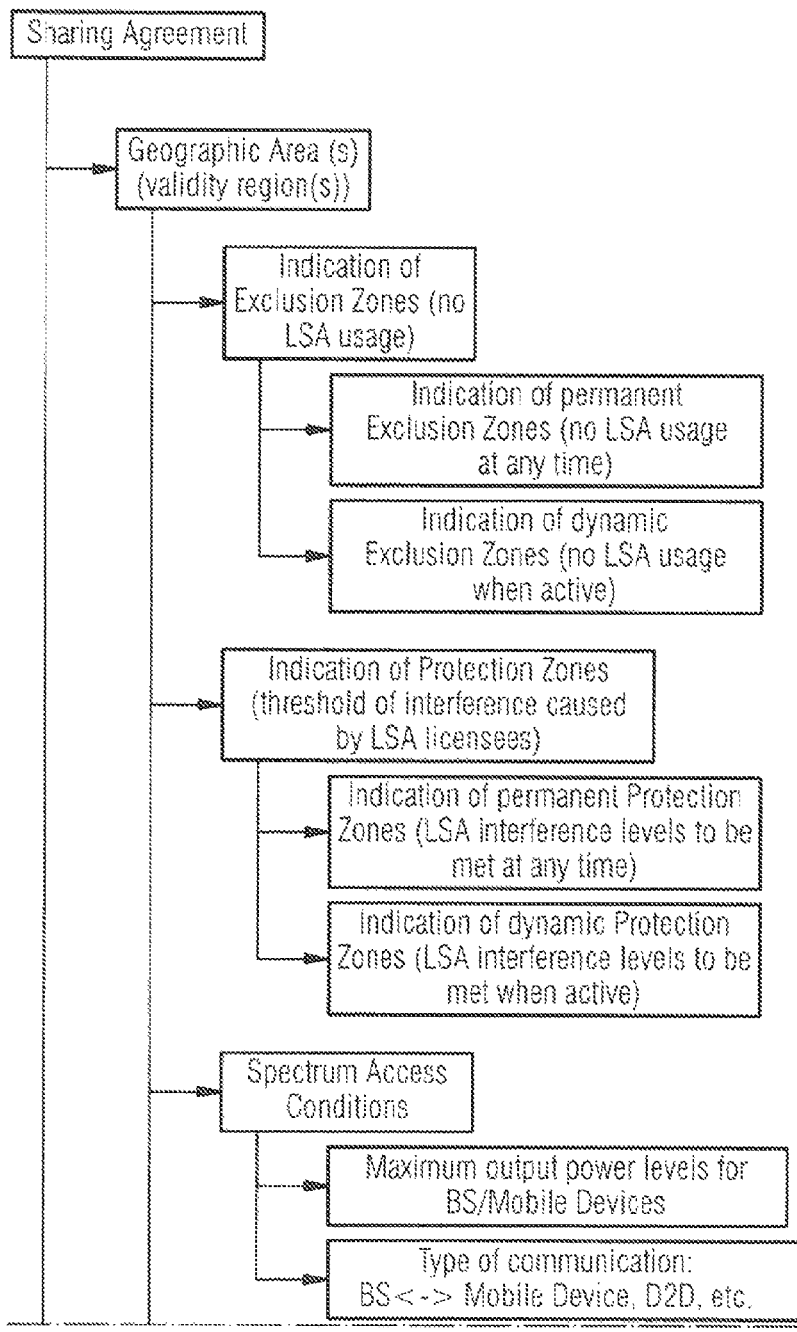
Figure 10B:
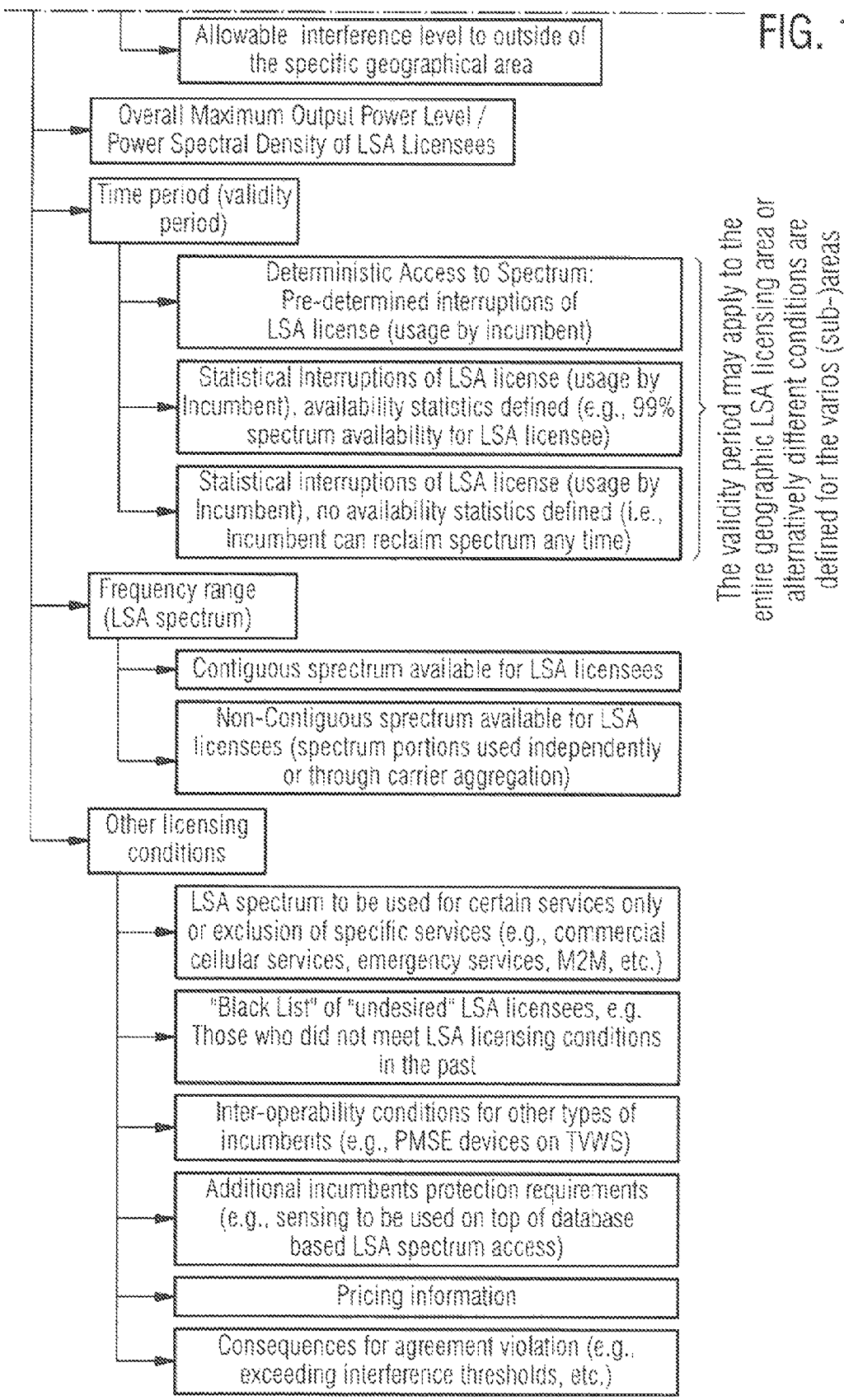

FIGS. 9 and 10 show example structures of sharing agreement announcements (including left-side portion 9A and right-side portion 9B) and sharing agreements (including left-side portion 10A and right-side portion 10B) as introduced in FIGS. 7 and 8. Depending on the level to which SLME 604 is involved in negotiations, SLME 604 may evaluate agreement conditions such as those included in the examples of FIGS. 9 and 10 in order to match licensees with incumbents that are offering suitable conditions for sharing agreements. As will be detailed, sharing agreement conditions such as geographical area, bandwidth, validity period, incumbent reclaiming parameters, interference and transmit power conditions, etc. may be important considerations for SLME 604 during negotiations. Although FIGS. 9 and 10 detail sharing agreement announcements and sharing agreements focused on an LSA context, the same information elements may be used (including PAL/GAA priority usage) in an analogous context for SAS. Depending on the usage context, some of the LSA elements may not be required in all cases; thus, only a sub-set of the LSA elements may be actually used.

The Geographical Area(s) field contains subfields that refer to Exclusion Zones, Protection Zones, Spectrum Access Conditions and Allowable Interference Levels. As introduced above, Exclusion Zones specify areas where no LSA usage is permitted, either permanently or during times when the incumbent is active. Protection Zones indicate the level of interference that LSA licensees can cause to the incumbent within the Geographical Area. This protection can be either permanent, i.e. with no interference to the incumbent allowed at any time, or dynamic, i.e. with no interference allowed when the incumbent is active in the Geographical Area. Exclusion Zones and Protection Zones may be fixed over the period of the agreement. Spectrum Access Conditions specify the maximum power levels allowed to be used by LSA network transmitters and Mobile Devices and the type of communications that is allowed by LSA licensees. The overall maximum output power level of all LSA licensees in the Geographical Area can also be specified. The level of allowable interference on the incumbent by the LSA licensee outside of its Geographical Area(s) can also be specified.

Accordingly, conditions related to interference and maximum transmit power may be of substantial importance to licensees 600a-600c; accordingly, SLME 604 may place an emphasis on identifying and negotiating for sharing agreements that offer high interference tolerance and high maximum transmit powers in order to afford licensees substantial freedom when accessing the shared spectrum.

The validity period of the agreement includes several possible subfields related to incumbent reclaiming conditions. These include Deterministic Access to Spectrum where the incumbent specifies predetermined interruptions to the LSA license and statistical interruptions to the spectrum license by the LSA licensee. Predetermined interruptions may be specified using specific time intervals (e.g. from 9 a.m. to 12 p.m. every week day). Statistical interruptions may be defined in terms of statistical measures, and may even be undefined where the incumbent may be allowed to reclaim the spectrum at any time. For statistical interruptions the incumbent can inform the LSA Controller that it will reclaim the spectrum from the LSA licensee immediately or within a specified period of time.

The Frequency range of the LSA spectrum may be either contiguous or un-contiguous with spectrum portions available to the LSA licensee independently or through carrier aggregation.

Other licensing conditions may be also included. The LSA spectrum may be specified to be used by certain services only or specific services can be excluded from the use of the LSA spectrum. Conditions may also be specified for inter-operability with other incumbents. Pricing information may be included in the license conditions. For example, more LSA spectrum availability and increased geographical area of spectrum availability may be dependent on the pricing structure. More spectrum and a large geographical area may be available to the LSA licenses for a higher price. Consequences for agreement violation (for example, future blacklisting of the LSA licensee) may also be specified; however, such violations may preferably be avoided (as much as possible) by inter-operability test campaigns.

The agreement conditions may be negotiable. The LSA Controller may also have several possible agreement options to choose from to provide the best agreement given the current spectrum request from the LSA licensee.

Note furthermore that parameters may be static/semi-static or dynamic. Basically all parameters can change type, but it is typically determined upfront, which parameter belongs to which "change rate class".

As previously indicated, sharing agreements may become increasingly dynamic and have considerably shorter-duration than currently detailed in many proposals. Accordingly, instead of having sharing agreements in the range of several years, licensees may be able to pursue sharing agreements that have durations of weeks, days, hours, or even minutes. In the aforementioned case of high-traffic events or periods (e.g. sporting events, seasonal tourist activity, etc.), this may present a valuable opportunity for operators to arrange short-term sharing agreements in order to support the temporarily increased traffic demands without having to invest significant long-term resources. Accordingly, in an exemplary case the time period fields from the sharing agreement announcements and sharing agreements may be defined by the following 'Sharing Agreement Levels':

a. Sharing Agreement Level 1 may relate to static LSA spectrum being available for a long time period (several months/years);

b. Sharing Agreement Level 2 may relate to static LSA spectrum being available for a medium time period (several weeks or a few months);

c. Sharing Agreement Level 3 may relate to static LSA spectrum being available for a short time period (several days or a few weeks);

d. Sharing Agreement Level 4 may relate to static LSA spectrum being available for a very short time period (several minutes/hours or a few days);

e. Sharing Agreement Level 5 may relate to dynamic LSA spectrum at high availability guarantee (e.g., it may be reclaimed by the incumbent very rarely leading to an availability time of, e.g., 99% for the LSA licensee) being available for a long time period (several months/years);

f. Sharing Agreement Level 6 may relate to dynamic LSA spectrum at high availability guarantee (e.g., it may be reclaimed by the incumbent very rarely leading to an availability time of, e.g., 99% for the LSA licensee) being available for a medium time period (several weeks or a few months);

g. Sharing Agreement Level 7 may relate to dynamic LSA spectrum at high availability guarantee (e.g., it may be reclaimed by the incumbent very rarely leading to an availability time of, e.g., 99% for the LSA licensee) being available for a short time period (several days or a few weeks);

h. Sharing Agreement Level 8 may relate to dynamic LSA spectrum at high availability guarantee (e.g., it may be reclaimed by the incumbent very rarely leading to an availability time of, e.g., 99% for the LSA licensee) being available for a very short time period (several minutes/hours or a few days);

i. Sharing Agreement Level 9 may relate to dynamic LSA spectrum at medium availability guarantee (e.g., it may be reclaimed by the incumbent very rarely leading to an availability time of, e.g., 75% for the LSA licensee) being available for a long time period (several months/years);

j. Sharing Agreement Level 10 may relate to dynamic LSA spectrum at medium availability guarantee (e.g., it may be reclaimed by the incumbent very rarely leading to an availability time of, e.g., 75% for the LSA licensee) being available for a medium time period (several weeks or a few months);

k. Sharing Agreement Level 11 may relate to dynamic LSA spectrum at medium availability guarantee (e.g., it may be reclaimed by the incumbent very rarely leading to an availability time of, e.g., 75% for the LSA licensee) being available for a short time period (several days or a few weeks);

l. Sharing Agreement Level 12 may relate to dynamic LSA spectrum at medium availability guarantee (e.g., it may be reclaimed by the incumbent very rarely leading to an availability time of, e.g., 75% for the LSA licensee) being available for a very short time period (several minutes/hours or a few days);

m. Sharing Agreement Level 13 may relate a specific proposal by the operator which does not fit under the above mentioned levels.

Alternatively, instead of predefined levels, the exact parameters of LSA spectrum availability may be indicated by e.g. LSA spectrum availability guarantees (e.g. a fixed/statistical guaranteed level of availability expressed e.g. by percentage) or LSA licensing periods (e.g., number of years, months, weeks, days, hours, minutes, etc.).

In addition to time availabilities, incumbents may also include bandwidth dependencies (such as licensing X MHz for a time period x and Y MHz for a time period y), which may be further extended to statistical quantities such as peak or average bandwidth (either in MHz, bits per second, or power spectral density).

Accordingly, SLME 604 may have a substantial range of variables to consider when assisting in allocating spectrum to licensees via sharing agreement negotiations. For example, SLME 604 may need to consider each of the requirements given by licensees in order to determine which incumbents are offering favorable agreement conditions and, upon identifying matches, may need to generate sharing agreements with conditions that meet the terms provided by both sides. SLME 604 may apply quantitative analysis in order to evaluate possible sharing agreements, which may include assigning weights to certain conditions depending on which the operator specifies are most important (e.g. duration, maximum transmit power, etc.), comparing conditions offered by incumbents to conditions requested by licensees according to the weights, and determining a quantitative metric, or 'score', for each of a plurality of possible sharing agreements (where each possible sharing agreement has different conditions). Accordingly, SLME 604 may be configured to evaluate each of a plurality of possibilities in order to arrive at a proposed sharing agreement producing the highest 'score', i.e. the proposed sharing agreement that produces the best quantitative match for the prospective licensee. SLME 604 may then select this highest scoring sharing agreement to propose to the prospective licensee.

Figure 11:
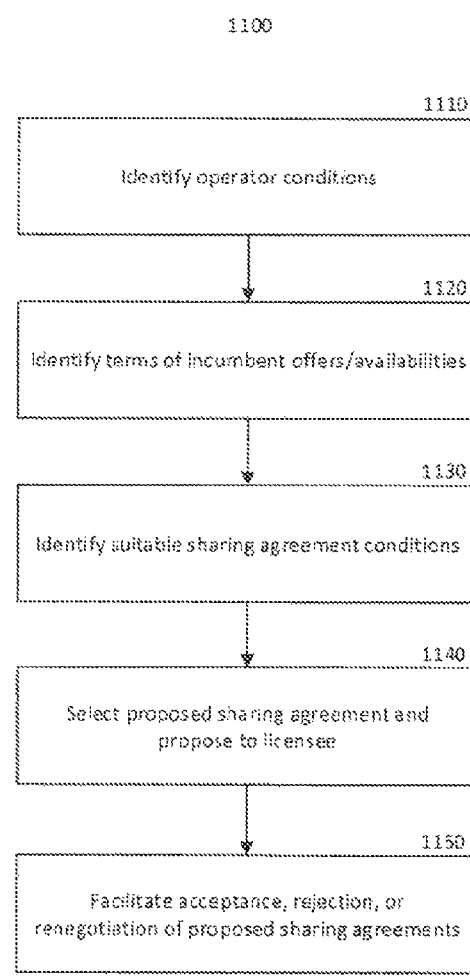
FIG. 11 shows a flow chart illustrating a spectrum allocation procedure.

FIG. 11 shows method 1100 detailing the general operation of SLME 604. As shown in FIG. 11, SLME 604 may identify operator conditions in 1110, which may include the targeted bands, duration, price, and any other conditions of sharing agreements as detailed regarding FIGS. 9 and 10. SLME 604 may then identify the terms of incumbent offers and availabilities in 1120. As SLME 604 may be positioned between operators/licensees 600a-600c and incumbents 606, SLME 604 may either request the licensee and operator conditions or may receive them unprompted. SLME 604 may either perform method 1100 for a single licensee of licensees 600a-600c or separately for each of licensees 600a-600c in order to propose a unique sharing agreement to each of licensees 600a-600c.

SLME 604 may then identify suitable sharing agreement conditions in 1130 based on the specified operator and incumbent conditions. As previously indicated, SLME 604 may be configured to control logic that directs SLME 604 to cross-reference the operator conditions with the operator conditions in order to identify sharing agreement conditions that would be acceptable to both parties. SLME 604 may apply a quantitative analysis, potentially based on weighting, that assigns a quantitative value to each condition and generates various different possible sharing agreements (composed of conditions) that each have a 'score' that indicates the suitability of the sharing agreement. As SLME 604 may perform method 1100 for more than one of licensees 600a-600c, SLME 604 may individually evaluate the potential conditions for sharing agreements for each participating one of licensees 600a-600c.

SLME 604 may then select the sharing agreement with the best 'score' in 1140 for each participating one of licensees 600a-600c and propose the respective selected sharing agreement to each participating one of licensees 600a-600c. Each participating one of licensees 600a-600c may then accept, reject, or trigger renegotiation of the proposed sharing agreements in 1150.

As previously indicated, SLME 604 may be configured to consider interference and radio conditions during spectrum allocation procedures such as those exemplified in FIGS. 7-9. As interference considerations are a major concern in spectrum sharing, particularly in restricting licensee interference to incumbents, SLME 604 may need to place considerable emphasis on ensuring that the proposed sharing agreements do not produce excessive interference for either side.

Accordingly, when considering which sharing agreements to propose to operators, SLME 604 may examine the terms of potential sharing agreements in order to evaluate interference conditions. As neighboring census tracts may be licensed to different operators, SLME 604 may also need to evaluate sharing agreements for neighboring geographic areas and/or consider sharing agreements for neighboring areas in a common evaluation process in order to determine which sharing agreements would be mutually beneficial to all licensees in terms of interference. Likewise, SLME 604 may need to evaluate the potential interference to incumbents that would be generated by proposed sharing agreements, as such interference may place severe transmit power restrictions on licensees in order to protect incumbents.

Figure 12:
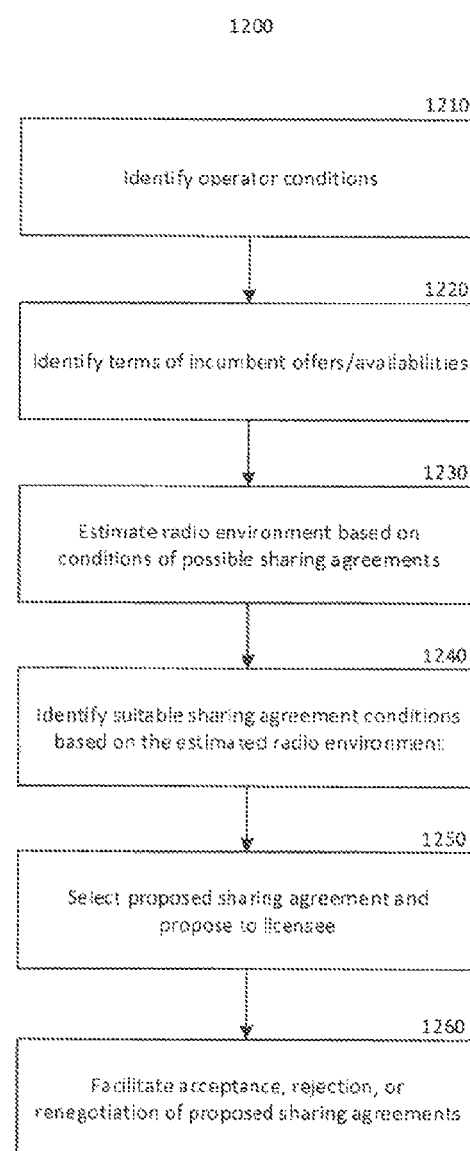
FIG. 12 shows a flow chart illustrating a spectrum allocation procedure with radio environment estimation.

Accordingly, as shown method 1200 of FIG. 12, SLME 604 may additionally estimate the radio environment for each licensee based on the conditions of the possible sharing agreements in 1230 (where 1210-1220 and 1240-1260 may be respectively equivalent to 1110-1150). Accordingly, in addition to evaluating sharing agreement conditions that are acceptable to both licensees 600a-600c and incumbents 606 in order to propose sharing agreements, SLME 604 may additionally determine which possible sharing agreements would result in favorable radio environments for both licensees 600a-600c and incumbents 606.

Figure 13:
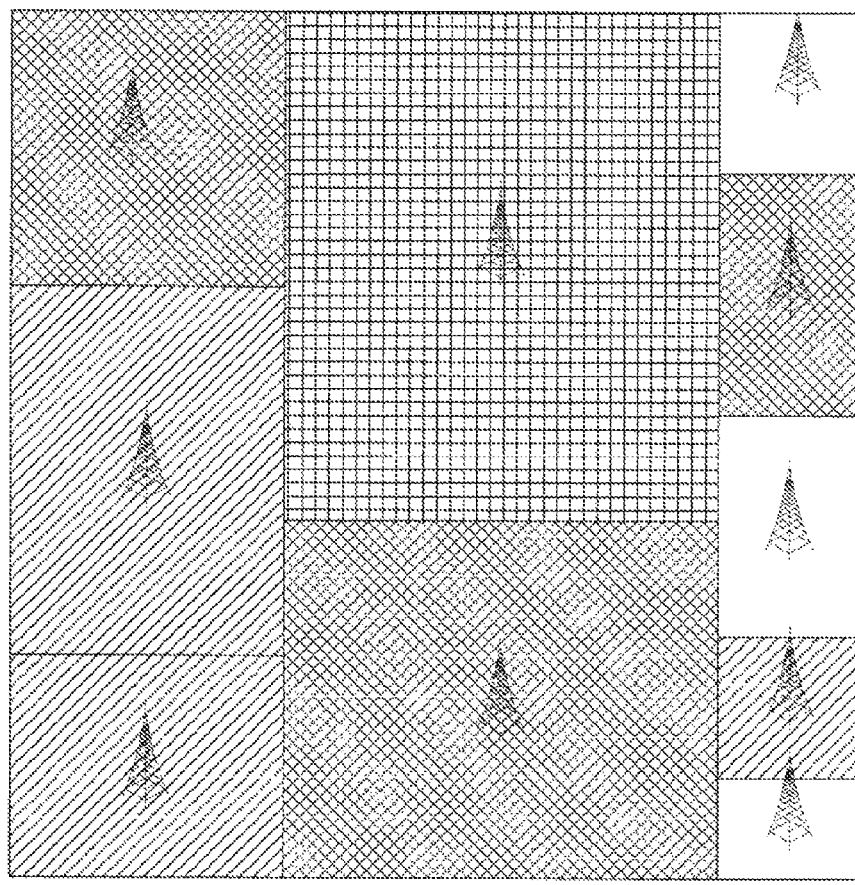
FIG. 13 shows an IREM.
Figure 14:
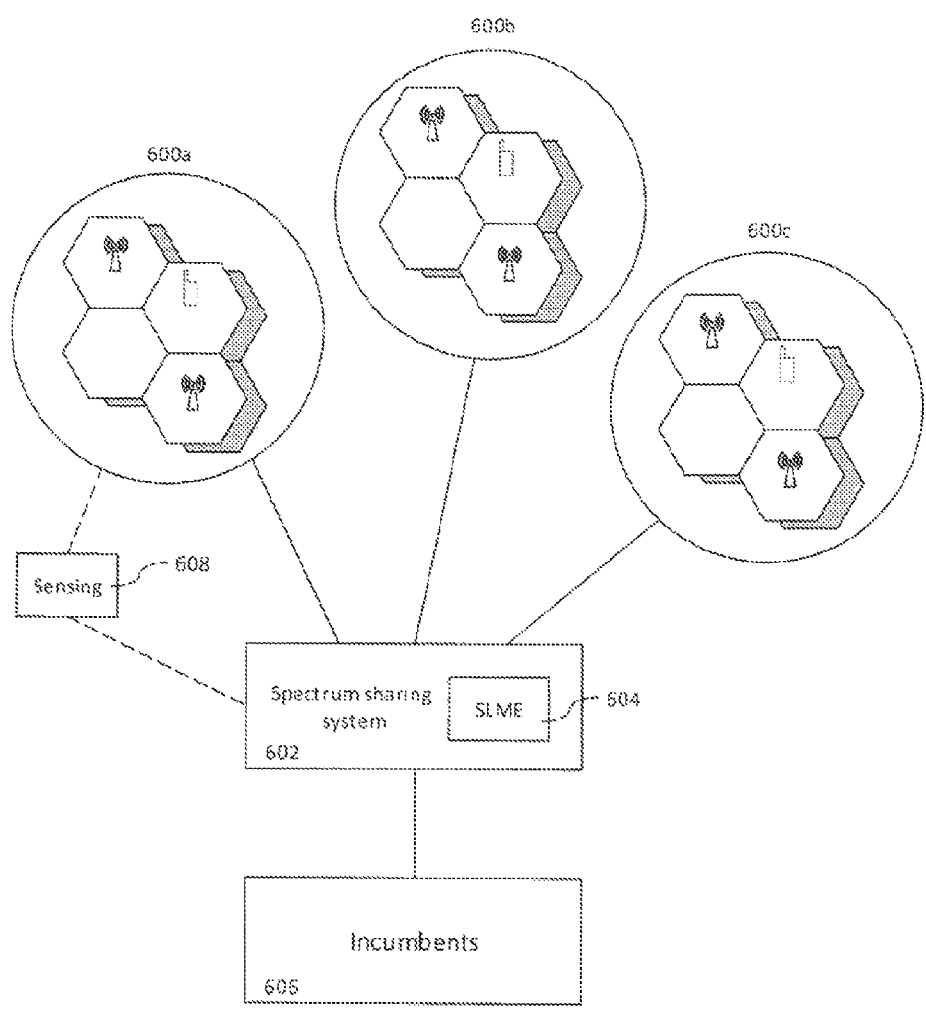
FIG. 14 shows a spectrum sharing network architecture with radio sensing.

For example, SLME 604 may generate an Interference Radio Environment Map (IREM) for each of a plurality of different possible sharing agreements that models the radio environment for one or more licensees and/or one or more incumbents. SLME 604 may be configured to generate IREMs as a computational process in which SLME 604 evaluates the geographic areas (census tracts) of potential sharing agreements and transmitter positions in order to estimate the radio environment that would result from the sharing agreements. FIG. 13 shows a simplified example in which SLME 604 may generate an IREM based on the hypothetical conditions of a potential sharing agreement. As shown in FIG. 13, SLME 604 may estimate the interference in the cells of each transmitter in a given area, where the interference level for each geographic area is denoted by the patterned shading.

Accordingly, in 1230 SLME 604 may generate such IREMs for multiple different candidate sharing agreements based on the conditions of the candidate sharing agreements. SLME 604 may thus apply a radio propagation model in order to generate the IREMs and may subsequently evaluate the resulting IREMs in order to determine which candidate sharing agreements would provide the best radio conditions for licensees and/or incumbents. Accordingly, the transmitters shown in the IREM of FIG. 13 may belong to a single licensee, multiple licensees, and/or one or more incumbents. Based on the IREMs, SLME 604 may identify which sharing agreement conditions are suitable in 1240 and subsequently generate a proposed sharing agreement to propose in 1240 that provides acceptable radio conditions.

More specifically, SLME 604 may identify the licensee and operator conditions and availabilities in 1210 and 1220, where the licensee conditions may include transmitter locations, transmit power, antenna height, antenna radiation patterns, access time, access bandwidth, etc. SLME 604 may then in 1230 generate the IREM by constructing a 2D pseudo-disk of the transmitters, where the overall coverage area will be a linear combination of the pseudo-disks. SLME 604 may compute the weights of each pseudo-disk based on the licensee conditions and incumbent availabilities and determine the maximum weighted independent set of licensees across the available spectrum. SLME 604 may thus identify favorable sharing agreements based on the identified IREMs and proceed to propose and facilitate the sharing agreements in 1250 and 1260. As SLME 604 may generate the IREMs based on more than one licensee, SLME 604 may be able to jointly select sharing agreements for multiple licensees in a single evaluation.

SLME 604 may consider interference in other alternative ways. For example, potential licensees may specify a desired geographic area and a maximum interference threshold in 1210 as part of the requested operator conditions. Accordingly, SLME 604 may consider the maximum interference threshold when deriving the proposed sharing agreements in 1230-1250. For example, when a licensee indicates that a high level of interference will be tolerated, SLME 604 may be able to propose sharing agreements that involve census tracts that are relatively proximate to other proposed or existing sharing agreements. Accordingly, there may be a wider range of different geographic areas that can be licensed (which may also lead to lower prices). Conversely, if a licensee indicates that only low levels of interference will be tolerated, SLME 604 may only be able to propose sharing agreements involving census tracts that are far from other proposed or existing sharing agreements. Such may allow the census tract to be protected, e.g. through low output power levels at cell edges and/or buffer zones that remain entirely unused between allocated zones. In this case, a reduced range of geographic areas may be available for licensing, thus potentially leading to higher prices.

As requests for low interference thresholds by licensees in 1210 may lead to higher priced sharing agreements, licensees may often need to reconsider the initially requested interference thresholds during renegotiation in order to obtain reasonably priced sharing agreements. Accordingly, SLME 604 may provide a first pricing suggestion that quotes the price of sharing agreements according to the licensee's requested conditions. If the price is too high, licensees may need to reconsider their requirements, such as by issuing a modified maximum interference threshold (where higher maximum interference thresholds will likely reduce the price). Alternatively, if the price is lower than expected, licensees may consider asking for more protected spectrum and/or more favorable agreement conditions, thus prompting SLME 604 to renegotiate for more expensive terms.

Alternatively to focusing on interference, SLME 604 may evaluate radio environments based on the expected permissible maximum transmit power of licensees. As many sharing agreements may contain provisions intended to protect incumbents via restricting interference, many sharing agreements may specify maximum transmit power levels that are permitted by the licensee. Accordingly, a licensee may need to obey any such conditions during access to the shared spectrum by ensuring that transmitters (including network transmitters such as base stations and terminal transmitters such as mobile terminals) do not exceed the maximum transit power thresholds. Accordingly, SLME 604 may utilize radio environment estimation in order to determine what the expected maximum transmit power levels would be for licensees for various possible sharing agreements and may generate sharing agreements for licensees that offer appropriate maximum transmit power levels (which may be a condition specified by licensees).

Additionally, SLME 604 may consider current radio measurements when evaluating sharing agreements. As shown in the alternative configuration of FIG. 12, sensing entity 608 may interface with one or both of licensee 600*a* and spectrum sharing system 602. Sensing entity 608 may be one or more devices (which may be distributed across a wide geographic area) configured to perform radio sensing, which may include mobile terminals or other dedicated sensing nodes (i.e. antenna systems with measurement circuitry configured to perform radio measurements, which may be e.g. an ESC or other sensing device provided as part of a spectrum sharing system) that are configured to obtain radio measurements and report the radio of licensee 600*a* or SLME 604. Sensing entity 608 may either be a component of the network deployed by licensee 600*a* (and thus may be included within the network of licensee 600*a*) or may be deployed by another party.

Sensing entity 608 may perform radio measurements and report the radio measurements to licensee 600*a* and/or SLME 604. In a configuration where sensing entity 608 reports radio measurements to licensee 600*a*, licensee 600*a* may be configured to request operator conditions for potential sharing agreements (e.g. in 1110 or 1210) based on the radio measurements provided by sensing entity 608. For example, licensee 600*a* may utilize the radio measurements in order to evaluate the current radio environments for different geographic locations, such as by identifying geographic areas with low-interference radio environments and geographic areas with high-interference radio environments. Licensee 600*a* may then request operator conditions based on the identified high- and low-interference radio environments, such as by targeting sharing agreements in low-interference census tracts while avoiding sharing agreements in high-interference census tracts.

Alternatively, in a configuration where sensing entity 608 provides radio measurements to SLME 604 (either directly or via licensee 600a), SLME 604 may utilize the reported radio measurements in order to evaluate radio environments (e.g. in 1230) in order to identify suitable sharing agreement conditions in 1240 based on the radio environments. Accordingly, as the radio measurements provided by sensing entity 608 may characterize the actual radio environment (as opposed to purely estimation-based), SLME 604 may be better-suited to identify sharing agreements that offer low-interference environments to licensees and/or incumbents. SLME 604 may additionally utilize the radio measurements in conjunction with estimation techniques such as IREM. SLME 604 may be able to dynamically adapt to changes in radio conditions via constant evaluation of radio measurements provided by sensing entity 608.

SLME 604 may therefore be able to determine the interference levels that would be imposed onto neighboring census tracts, such as to ensure protection to incumbents and/or other licensees with maximum interference guarantees. If the maximum interference thresholds can be maintained, SLME 604 may facilitate negotiation for sharing agreements in 1260 (where the licensees being evaluated by sensing entity 608 may additionally adjust the transmit power levels in order to modify the imposed interference, which may additionally affect the price of a prospective sharing agreement).

SLME 604 may additionally be configured to handle contention scenarios in shared spectrum access. While SAS PALs and LSA licensees may in many cases be able to exclusively license a shared band from an incumbent, lower-tier operators such as SAS GAA licensees may need to deal with access contention with other GAA operators. As SAS GAA licensees may not be granted exclusive access to a given shared band, GAA licensees may need to 'compete' with other GAA users for access to the same channel (i.e. the same spectrum band a the same location and time). Accordingly, SAS systems may assume that the underlying technology employed by the GAA users manage contention, such as e.g. based on a Carrier Sense Multiple Access with collision avoidance (CSMA/CA) procedure in the Media Access Control (MAC) layer. Many existing RATs contain such functionality, including e.g. WIFI, 3GPP Licensed Assisted Access (LAA), MuLTEFire, unlicensed LTE (LTE-U), etc., which may potentially include some adaptations required for SAS usage such as e.g. the possibility to connect to a SAS entity and the ability to protect incumbent users.

As scenarios may occur where multiple GAA users are targeting the same spectrum for usage, SLME 604 may handle spectrum allocation procedures in consideration of potential contention scenarios. In the early phases of SAS deployment, it is expected that only a small number of users will actually use the shared spectrum. Typically, the number of system access at a given location and time will be less than the number of available frequency slots; accordingly, the SAS controller may be able to grant access in such a way that every GAA system may be allocated to a different channel. As contention only happens when two or more systems compete for access to the same channel at the same location and time, contention may be avoided in these scenarios as only one system may be allocated to the channel.

As contention may be avoided when only a small number of users are present, SLME 604 may grant access to GAA systems that do not support contention-based access, such as e.g. traditional 3GPP LTE TDD systems originally designed for usage in dedicated licensed bands that do not support any contention-based access. However, as soon as more than one single GAA system is allocated to a given band, SLME 604 may need to either i) force all users to move contention-based access systems, or ii) still allow access for the original non-contention-based access systems (e.g. 3GPP LTE TDD) but force any further systems to ensure fair channel access in a complex hybrid environment where non-contention-based access systems must coexist with contention-based access systems (e.g. WiFi, MuLTEfire, LTE-U, etc. including any adaptations required for SAS). Typically, it may not be possible to modify the original non-contention-based access systems; thus SLME 604 may only allow contention-based access systems to access the shared spectrum if they provide suitable provisions to support the coexistence of both contention-based and non-contention-based systems. One possibility is that the contention-based access systems may interact with the non-contention-based access systems (e.g. through the SAS controller or directly) in order to allocate (fixed) time-slots in which the non-contention-based access systems are allowed to access the shared spectrum, e.g. the LTE TDD fixed periods are agreed when the system is allowed to access the shared spectrum for uplink and downlink. Accordingly, in the remaining time, the contention-based access systems may compete for access to the shared spectrum as defined by the respective standards, e.g. based on the CSMA/CA protocol.

Accordingly, in such hybrid access environments SLME 604 may control the correct operation of the hybrid access scheme and, in case unfair sharing of the shared spectrum is observed, undertake countermeasures such as i) forbid the usage of contention-based access systems in order to ensure proper operation of the originally-deployed non-contentions-based access systems or ii) forbid the usage of the originally-deployed non-contention-based access systems as they substantially reduce the efficiency of resource usage.

Accordingly, given the placement of SLME 604 between licensees and incumbents, SLME 604 may be able to match licensees to incumbents based on conditions specified by both parties. Additionally, SLME 604 may be configured to evaluate sharing agreement conditions based on evaluations of radio environments, either through estimations/simulations (including IREMS) and/or actual radio measurements obtained via sensing. SLME 604 may thus present an attractive tool in facilitating desirable sharing agreements for both licensees and incumbents.

After a licensee has agreed to a sharing agreement, the licensee may begin to access the shared spectrum by activating transmitters (e.g. base stations and mobile terminals) on the shared spectrum according to the conditions agreed upon in the sharing agreement. The licensee may need to ensure that the conditions of the sharing agreement are obeyed, in particular for interference and maximum transmit power levels.

Figure 15:
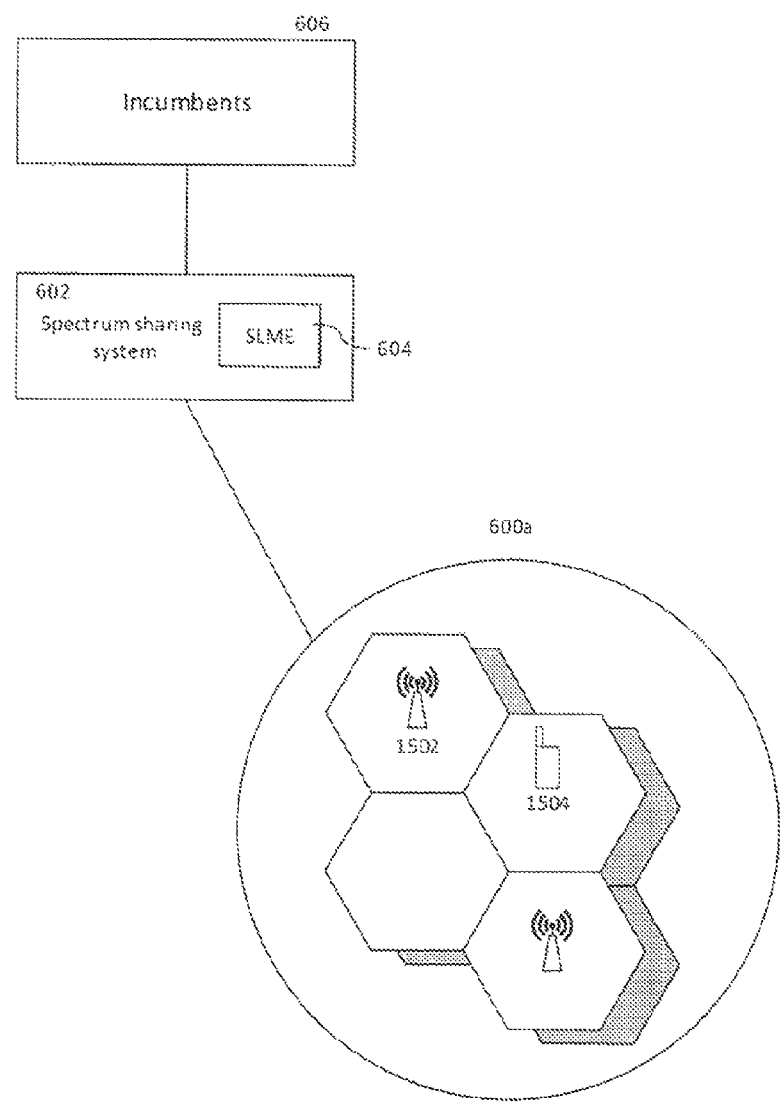
FIG. 15 shows a spectrum sharing network architecture with licensee base stations and mobile terminals.

FIG. 15 shows a network diagram with base station 1502 and mobile terminal 1504, which may be part of the network of the radio access network of licensee 600a. Once a sharing agreement is confirmed, both base station 1502 and mobile terminal 1504 may begin using the shared spectrum band as agreed in the sharing agreement. Accordingly, base station 1502 may add the shared band to the resources available to the base station, which may include applying carrier aggregation in order to combine usage of existing resources (e.g. dedicated licensed spectrum) with the newly available shared bands. Mobile terminal 1504 may similarly begin accessing the newly available shared band, which may be used for one or both of uplink and downlink.

Alternatively, in certain scenarios a sharing agreement may expire and/or the licensee may revise a sharing agreement that omits a previously-available shared band. Accordingly, base station 1502 and mobile terminal 1504 may no longer be able to use the omitted/expired shared band, and may need to discontinue its usage. Accordingly, base station 1502 may remove the shared band from carrier aggregation.

Alternatively, a licensee may agree to a new sharing and/or revise a sharing agreement that has more (or less) restrictive terms for access. Accordingly, base station 1502 and mobile terminal 1504 may need to adjust radio communications on the shared band in order to obey the new terms of access. In certain cases, more restrictive rules may result in a scenario where usage of the band does not make sense for some/all mobile terminals, e.g. if permitted transmit powers are so low that distant mobile terminals can no longer transmit/receive uplink/downlink communications. Accordingly, base station 1502 may even discontinue usage of shared bands even though they are licensed.

As base station 1502 plays a controlling role of mobile terminal 1504, base station 1502 may enact the majority of such changes, and accordingly may be responsible for providing mobile terminal 1504 with control information that informs mobile terminal 1504 of available spectrum. The modification of licensed shared spectrum may in some cases be transparent to mobile terminal 1504; in other words, the control signaling provided by base station 1502 may not indicate specific details about shared spectrum and may simply instruct mobile terminal 1504 to utilize certain spectrum.

Figure 16:
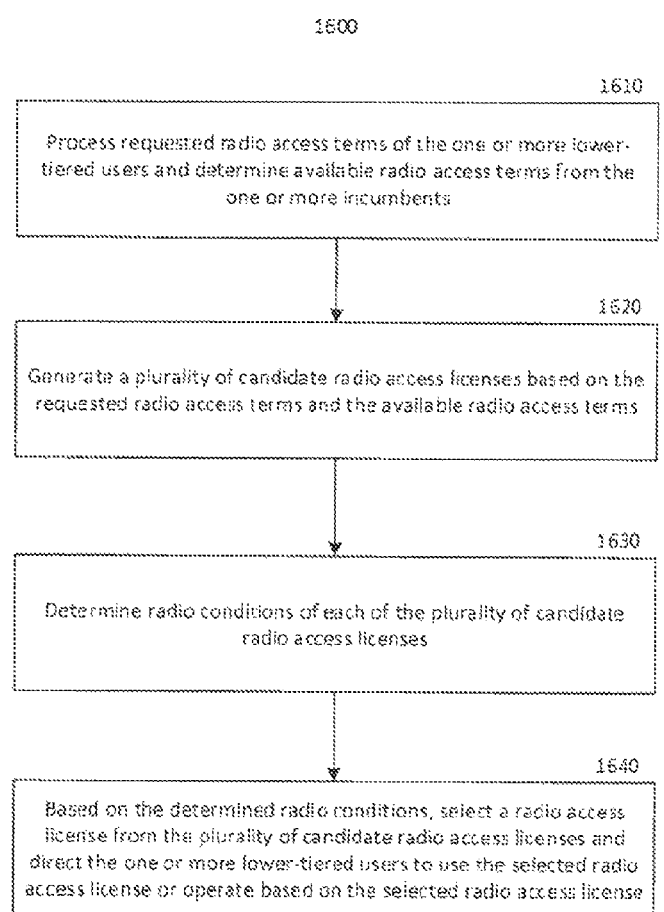
FIG. 16 shows a first method of allocating radio spectrum between a licensee and one or more incumbents.

FIG. 16 shows method 1600 of allocating radio spectrum between a licensee and one or more incumbents. As shown in FIG. 16, method 1600 includes processing requested radio access terms of the one or more lower-tiered users and determining available radio access terms from the one or more incumbents (x16y10), generating a plurality of candidate radio access licenses based on the requested radio access terms and the available radio access terms (x16y20), determining radio conditions of each of the plurality of candidate radio access licenses (x16y30), and based on the determined radio conditions, selecting a radio access license from the plurality of candidate radio access licenses and directing the one or more lower-tiered users to use the selected radio access license or operate based on the selected radio access license (x16y40).

Figure 17:
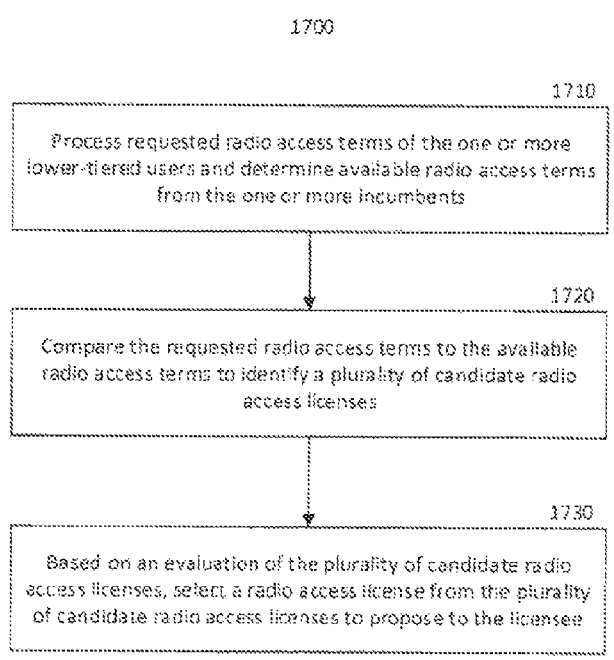
FIG. 17 shows a second method of allocating radio spectrum between a licensee and one or more incumbents.

FIG. 17 shows method 1700 of allocating radio spectrum between a licensee and one or more incumbents. As shown in FIG. 17, method 1700 includes processing requested radio access terms of the one or more lower-tiered users and determining available radio access terms from the one or more incumbents (x17y10), comparing the requested radio access terms to the available radio access terms to identify a plurality of candidate radio access licenses (x17y20), based on an evaluation of the plurality of candidate radio access licenses, selecting a radio access license from the plurality of candidate radio access licenses to direct the one or more lower-tiered users to use or operate based on (x17y30).

In various aspects of this disclosure, SLME 604 (or 308/406*a*/406*b*) may be characterized as a non-transitory computer readable medium storing program code that when executed by a processor (e.g. of SLME 604) directs the processor to perform method 1600 or 1700. In one or more further exemplary aspects of the disclosure, one or more of the features described above in reference to FIGS. 1-15 may be further incorporated into method 1600 and/or 1700. In particular, method 1600 and/or 1700 may be configured to perform further and/or alternate processes as detailed regarding SLME 604 (or 308/406*a*/406*b*).

The SLMEs proposed herein may not be limited to any particular position within a communication network, however, advantageous deployments may place SLMEs between licensees and incumbents in order to effectively match licensees to incumbents based on the requested conditions for sharing agreements. Additionally, while the SLMEs have been detailed herein as being a processor executing program code, an SLME may be divided into multiple locations, e.g. two or more processors that each execute separate program code that collectively realizes SLME functionalities.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a method of allocating radio spectrum between one or more lower-tiered users and one or more incumbents, the method including processing requested radio access terms of the one or more lower-tiered users and determining available radio access terms from the one or more incumbents, generating a plurality of candidate radio access licenses based on the requested radio access terms and the available radio access terms, determining radio conditions of each of the plurality of candidate radio access licenses, and based on the determined radio conditions, selecting a radio access license from the plurality of candidate radio access licenses and directing the one or more lower-tiered users to use the selected radio access license or operate based on the selected radio access license.

In Example 2, the subject matter of Example 1 can optionally further include measuring radio signals with one or more radio sensors, wherein determining the radio conditions of each of the plurality of candidate radio access licenses includes determining the radio conditions of each of the plurality of candidate radio access licenses based on the measured radio signals.

In Example 3, the subject matter of Example 1 or 2 can optionally include wherein determining the radio conditions of each of the plurality of candidate radio access licenses includes identifying one or more parameters of each of the plurality of candidate radio access licenses that are related to radio propagation, and estimating the radio conditions of each of the plurality of candidate radio access licenses by applying a radio propagation model to the one or more parameters of each of the plurality of candidate radio access licenses.

In Example 4, the subject matter of Example 3 can optionally include wherein estimating the radio conditions of each of the plurality of candidate radio access licenses by applying the propagation model to the one or more parameters of each of the plurality of candidate radio access licenses includes generating a radio environment map (REM) for each of the plurality of candidate radio access licenses.

In Example 5, the subject matter of Example 3 or 4 can optionally include wherein the one or more parameters of each of the plurality of candidate radio access licenses that are related to radio propagation include one or more of transmit power, transmitter location, geographic area, antenna pattern, antenna height, access time, or access bandwidth.

In Example 6, the subject matter of any one of Examples 1 to 4 can optionally include wherein selecting the radio access license from the plurality of candidate radio access licenses based on the determined radio conditions includes evaluating the determined radio conditions to identify a radio access license of the plurality of candidate radio access licenses that provides advantageous estimated radio conditions and selecting the identified radio access license to propose to the one or more lower-tiered users.

In Example 7, the subject matter of Example 6 can optionally include wherein evaluating the determined radio conditions to identify the radio access license of the plurality of candidate radio access licenses that provides advantageous estimated radio conditions includes identifying radio access licenses that are estimated to provide at least one of low interference or high permitted transmit power.

In Example 8, the subject matter of any one of Examples 1 to 7 can optionally include wherein determining radio conditions of each of the plurality of candidate radio access licenses includes determining an interference level to at least one of the one or more incumbents or to at least one of the one or more lower-tiered users for each of the plurality of candidate radio access licenses, wherein selecting the radio access license from the plurality of candidate radio access licenses based on the determined radio conditions includes selecting the proposed radio access license based on the estimated interference levels.

In Example 9, the subject matter of any one of Examples 1 to 8 can optionally include wherein the requested radio access terms and the available radio access terms include one or more of bandwidth, license duration, incumbent reclaim parameters, interference restrictions, transmit power restrictions, or license price.

In Example 10, the subject matter of any one of Examples 1 to 9 can optionally include wherein selecting the radio access license from the plurality of candidate radio access licenses based on the determined radio conditions includes rating each of the plurality of candidate radio access licenses based on the determined radio conditions, and selecting a highest-rated radio access license from the plurality of candidate radio access licenses to propose to the one or more lower-tiered users.

In Example 11, the subject matter of any one of Examples 1 to 10 can optionally further include if the one or more lower-tiered users decline the selected radio access license, generating a plurality of additional candidate radio access licenses and selecting an additional radio access license from the plurality of additional candidate radio access licenses to direct the one or more lower-tiered users to use or operate based on.

In Example 12, the subject matter of Example 11 can optionally further include if the one or more lower-tiered users decline the selected radio access license, receiving at least one of updated requested radio access terms and updated available radio access terms, wherein selecting the additional radio access license to direct the one or more lower-tiered users to use or operate based on includes selecting the additional radio access license to propose to the one or more lower-tiered users based on at least one of the updated requested radio access terms and the updated available radio access terms.

In Example 13, the subject matter of Example 12 can optionally further include determining radio conditions of each of the plurality of additional candidate radio access licenses, wherein selecting the additional radio access license to propose to the one or more lower-tiered users based on at least one of the updated requested radio access terms and the updated available radio access terms includes selecting the additional radio access license to propose to the one or more lower-tiered users based on the determined radio conditions of each of the plurality of additional candidate radio access licenses.

In Example 14, the subject matter of any one of Examples 1 to 13 can optionally further include receiving an acceptance of the proposed radio access license from the one or more lower-tiered users, and if one of the one or more incumbents reclaim spectrum of the proposed access license, generating one or more further candidate radio access licenses to propose to the one or more lower-tiered users to replace the reclaimed spectrum.

In Example 15, the subject matter of any one of Examples 1 to 14 can optionally include wherein the one or more incumbents are a plurality of incumbents and wherein the one or more lower-tiered users are a plurality of lower-tiered users, the method further including processing requested radio access terms of each of the plurality of lower-tiered users and determining available radio access terms from each of the plurality of incumbents, and selecting a radio access license to propose to each of the plurality of lower-tiered users based on the requested radio access terms of each of the plurality of lower-tiered users and the available radio access terms of each of the plurality of incumbents.

In Example 16, the subject matter of Example 15 can optionally further include generating a plurality of further candidate radio access licenses based on the requested radio access terms of each of the plurality of lower-tiered users and the available radio access terms of each of the plurality of incumbents, and jointly evaluating a subset of the plurality of further candidate radio access licenses with a radio propagation model to identify candidate radio access licenses that are expected to provide reduced interference.

In Example 17, the subject matter of any one of Examples 1 to 16 can optionally include wherein the proposed radio access license is a radio access license for a spectrum sharing scheme.

In Example 18, the subject matter of any one of Examples 1 to 17 can optionally include wherein the proposed radio access license is a radio access license for a Licensed Shared Access (LSA) scheme or Spectrum Access System (SAS) scheme.

In Example 19, the subject matter of any one of Examples 1 to 18 can optionally further include triggering transmission or reception of radio signals on spectrum licensed as part of the radio access license.

In Example 20, the subject matter of any one of Examples 1 to 18 can optionally further include transmitting or receiving radio signals on spectrum licensed as part of the radio access license.

Example 21 is a non-transitory computer readable medium storing program code that when executed by a processor direct the processor to perform the method of any one of Examples 1 to 20.

Example 22 is a processor configured to support execution of program code to perform the method of any one of Examples 1 to 20.

Example 23 is a network control node including a processor configured to perform the method of any one of Examples 1 to 20.

Example 24 is a non-transitory computer readable medium storing instructions that when executed by a processor direct the processor to perform a radio spectrum allocation method including processing requested radio access terms of one or more lower-tiered users and determining available radio access terms from one or more incumbents, generating a plurality of candidate radio access licenses based on the requested radio access terms and the available radio access terms, determining radio conditions of each of the plurality of candidate radio access licenses, and based on the determined radio conditions, selecting a radio access license from the plurality of candidate radio access licenses and directing the one or more lower-tiered users to use the selected radio access license or operated based on the selected radio access license.

In Example 25, the subject matter of Example 24 can optionally include the method further including measuring radio signals with one or more radio sensors, wherein determining the radio conditions of each of the plurality of candidate radio access licenses includes determining the radio conditions of each of the plurality of candidate radio access licenses based on the measured radio signals.

In Example 26, the subject matter of Example 24 or 25 can optionally include wherein determining the radio conditions of each of the plurality of candidate radio access licenses includes identifying one or more parameters of each of the plurality of candidate radio access licenses that are related to radio propagation, and estimating the radio conditions of each of the plurality of candidate radio access licenses by applying a radio propagation model to the one or more parameters of each of the plurality of candidate radio access licenses.

In Example 27, the subject matter of Example 26 can optionally include wherein estimating the radio conditions of each of the plurality of candidate radio access licenses by applying the propagation model to the one or more parameters of each of the plurality of candidate radio access licenses includes generating a radio environment map (REM) for each of the plurality of candidate radio access licenses.

In Example 28, the subject matter of Example 26 or 27 can optionally include wherein the one or more parameters of each of the plurality of candidate radio access licenses that are related to radio propagation include one or more of transmit power, transmitter location, geographic area, antenna pattern, antenna height, access time, or access bandwidth.

In Example 29, the subject matter of any one of Examples 24 to 28 can optionally include wherein selecting the radio access license from the plurality of candidate radio access licenses based on the determined radio conditions includes evaluating the determined radio conditions to identify a radio access license of the plurality of candidate radio access licenses that provides advantageous estimated radio conditions and selecting the identified radio access license to propose to the one or more lower-tiered users.

In Example 30, the subject matter of Example 29 can optionally include wherein evaluating the determined radio conditions to identify the radio access license of the plurality of candidate radio access licenses that provides advantageous estimated radio conditions includes identifying radio access licenses that are estimated to provide at least one of low interference or high permitted transmit power.

In Example 31, the subject matter of any one of Examples 24 to 30 can optionally include wherein determining radio conditions of each of the plurality of candidate radio access licenses includes estimating an interference level to at least one of the one or more incumbents or to at least one of the one or more lower-tiered users for each of the plurality of candidate radio access licenses, wherein selecting the radio access license from the plurality of candidate radio access licenses based on the determined radio conditions includes selecting the proposed radio access license based on the determined interference levels.

In Example 32, the subject matter of any one of Examples 24 to 31 can optionally include wherein the requested radio access terms and the available radio access terms include one or more of bandwidth, license duration, incumbent reclaim parameters, interference restrictions, transmit power restrictions, or license price.

In Example 33, the subject matter of any one of Examples 24 to 32 can optionally include wherein selecting the radio access license from the plurality of candidate radio access licenses based on the determined radio conditions includes rating each of the plurality of candidate radio access licenses based on the determined radio conditions, and selecting a highest-rated radio access license from the plurality of candidate radio access licenses to propose to the one or more lower-tiered users.

In Example 34, the subject matter of any one of Examples 24 to 33 can optionally include the method further including if the one or more lower-tiered users decline the proposed radio access license, generating a plurality of additional candidate radio access licenses and selecting an additional radio access license from the plurality of additional candidate radio access licenses to direct the one or more lower-tiered users to user or operate based on.

In Example 35, the subject matter of Example 34 can optionally include the method further including if the one or more lower-tiered users decline the selected radio access license, receiving at least one of updated requested radio access terms and updated available radio access terms, wherein selecting the additional radio access license to direct the one or more lower-tiered users to user or operate based on includes selecting the additional radio access license to propose to the one or more lower-tiered users based on at least one of the updated requested radio access terms and the updated available radio access terms.

In Example 36, the subject matter of Example 35 can optionally include the method further including estimating radio conditions of each of the plurality of additional candidate radio access licenses, wherein selecting the additional radio access license to direct the one or more lower-tiered users to use or operate based on at least one of the updated requested radio access terms and the updated available radio access terms includes selecting the additional radio access license to propose to the one or more lower-tiered users based on the determined radio conditions of each of the plurality of additional candidate radio access licenses.

In Example 37, the subject matter of any one of Examples 24 to 36 can optionally include the method further including receiving an acceptance of the proposed radio access license from the one or more lower-tiered users, and if one of the one or more incumbents reclaim spectrum of the proposed access license, generating one or more further candidate radio access licenses to propose to the one or more lower-tiered users to replace the reclaimed spectrum.

In Example 38, the subject matter of any one of Examples 24 to 37 can optionally include wherein the one or more incumbents are a plurality of incumbents and wherein the one or more lower-tiered users are a plurality of lower-tiered users, the method further including processing requested radio access terms of each of the plurality of lower-tiered users and determining available radio access terms from each of the plurality of incumbents, and selecting a radio access license to propose to each of the plurality of lower-tiered users based on the requested radio access terms of each of the plurality of lower-tiered users and the available radio access terms of each of the plurality of incumbents.

In Example 39, the subject matter of Example 38 can optionally include the method further including generating a plurality of further candidate radio access licenses based on the requested radio access terms of each of the plurality of lower-tiered users and the available radio access terms of each of the plurality of incumbents, and jointly evaluating a subset of the plurality of further candidate radio access licenses with a radio propagation model to identify candidate radio access licenses that are expected to provide reduced interference.

In Example 40, the subject matter of any one of Examples 24 to 39 can optionally include wherein the proposed radio access license is a radio access license for a spectrum sharing scheme.

In Example 41, the subject matter of any one of Examples 24 to 40 can optionally include wherein the proposed radio access license is a radio access license for a Licensed Shared Access (LSA) scheme or Spectrum Access System (SAS) scheme.

In Example 42, the subject matter of any one of Examples 24 to 41 can optionally include the method further including triggering transmission or reception of radio signals on spectrum licensed as part of the radio access license.

In Example 43, the subject matter of any one of Examples 24 to 41 can optionally include the method further including transmitting or receiving radio signals on spectrum licensed as part of the radio access license.

Example 44 is a method of allocating radio spectrum between a one or more lower-tiered users and one or more incumbents, the method including processing requested radio access terms of the one or more lower-tiered users and determining available radio access terms from the one or more incumbents, comparing the requested radio access terms to the available radio access terms to identify a plurality of candidate radio access licenses, based on an evaluation of the plurality of candidate radio access licenses, selecting a radio access license from the plurality of candidate radio access licenses to direct the one or more lower-tiered users to use or operate based on.

In Example 45, the subject matter of Example 44 can optionally include wherein the evaluation of the plurality of candidate radio access licenses includes rating each of the plurality of candidate radio access licenses based on a predefined rating criteria, wherein selecting a radio access license from the plurality of candidate radio access licenses to direct the one or more lower-tiered users to use or operate based on includes selecting a highest-rated candidate radio access license of the plurality of candidate radio access licenses.

In Example 46, the subject matter of Example 45 can optionally include wherein the predefined rating criteria quantitatively rates each of the plurality of candidate radio access licenses based on the degree to which each candidate radio access license matches the requested radio access terms of the one or more lower-tiered users.

In Example 47, the subject matter of any one of Examples 44 to 46 can optionally further include determining radio conditions of each of the plurality of candidate radio access licenses, wherein selecting a radio access license from the plurality of candidate radio access licenses to direct the one or more incumbents to use or operate based on includes selecting the proposed candidate radio access license based on the determined radio conditions.

In Example 48, the subject matter of Example 47 can optionally further include measuring radio signals with one or more radio sensors, wherein determining the radio conditions of each of the plurality of candidate radio access licenses includes determining the radio conditions of each of the plurality of candidate radio access licenses based on the measured radio signals.

In Example 49, the subject matter of Example 47 or 48 can optionally include wherein determining the radio conditions of each of the plurality of candidate radio access licenses includes identifying one or more parameters of each of the plurality of candidate radio access licenses that are related to radio propagation, and estimating the radio conditions of each of the plurality of candidate radio access licenses by applying a radio propagation model to the one or more parameters of each of the plurality of candidate radio access licenses.

In Example 50, the subject matter of Example 49 can optionally include wherein estimating the radio conditions of each of the plurality of candidate radio access licenses by applying the propagation model to the one or more parameters of each of the plurality of candidate radio access licenses includes generating a radio environment map (REM) for each of the plurality of candidate radio access licenses.

In Example 51, the subject matter of Example 49 or 50 can optionally include wherein the one or more parameters of each of the plurality of candidate radio access licenses that are related to radio propagation include one or more of transmit power, transmitter location, geographic area, antenna pattern, antenna height, access time, or access bandwidth.

In Example 52, the subject matter of any one of Examples 47 to 51 can optionally include wherein selecting the radio access license from the plurality of candidate radio access licenses based on the determined radio conditions to direct the one or more lower-tiered users to use or operate based on includes evaluating the determined radio conditions to identify a radio access license of the plurality of candidate radio access licenses that provides advantageous estimated radio conditions and selecting the identified radio access license to propose to the one or more lower-tiered users.

In Example 53, the subject matter of Example 52 can optionally include wherein evaluating the determined radio conditions to identify the radio access license of the plurality of candidate radio access licenses that provides advantageous estimated radio conditions includes identifying radio access licenses that are estimated to provide at least one of low interference or high permitted transmit power.

In Example 54, the subject matter of any one of Examples 47 to 53 can optionally include wherein determining radio conditions of each of the plurality of candidate radio access licenses includes estimating an interference level to at least one of the one or more incumbents or to the one or more lower-tiered users for each of the plurality of candidate radio access licenses.

In Example 55, the subject matter of any one of Examples 44 to 54 can optionally include wherein the requested radio access terms and the available radio access terms include one or more of bandwidth, license duration, incumbent reclaim parameters, interference restrictions, transmit power restrictions, or license price.

In Example 56, the subject matter of any one of Examples 44 to 55 can optionally further include if the one or more lower-tiered users decline the proposed radio access license, generating a plurality of additional candidate radio access licenses and selecting an additional radio access license from the plurality of additional candidate radio access licenses to direct the one or more lower-tiered users to use or operate based on.

In Example 57, the subject matter of Example 56 can optionally further include if the one or more lower-tiered users decline the selected radio access license, receiving at least one of updated requested radio access terms and updated available radio access terms, wherein selecting the additional radio access license to direct the one or more lower-tiered users to use or operate based on includes selecting the additional radio access license to propose to the one or more lower-tiered users based on at least one of the updated requested radio access terms and the updated available radio access terms.

In Example 58, the subject matter of Example 57 can optionally further include determining radio conditions of each of the plurality of additional candidate radio access licenses, wherein selecting the additional radio access license to propose to the one or more lower-tiered users based on at least one of the updated requested radio access terms and the updated available radio access terms includes selecting the additional radio access license to propose to the one or more lower-tiered users based on the estimated radio conditions of each of the plurality of additional candidate radio access licenses.

In Example 59, the subject matter of any one of Examples 44 to 58 can optionally further include receiving an acceptance of the proposed radio access license from the one or more lower-tiered users, and if the one or more incumbents reclaim spectrum of the proposed access license, generating one or more further candidate radio access licenses to propose to the one or more lower-tiered users to replace the reclaimed spectrum.

In Example 60, the subject matter of any one of Examples 44 to 59 can optionally include wherein the one or more incumbents are a plurality of incumbents and wherein the one or more lower-tiered users are a plurality of lower-tiered users, the method further including processing requested radio access terms of each of the plurality of lower-tiered users and determining available radio access terms from each of the plurality of incumbents, and selecting a radio access license to propose to each of the plurality of lower-tiered users based on the requested radio access terms of each of the plurality of lower-tiered users and the available radio access terms of each of the plurality of incumbents.

In Example 61, the subject matter of any one of Examples 44 to 60 can optionally include wherein the proposed radio access license is a radio access license for a spectrum sharing scheme.

In Example 62, the subject matter of any one of Examples 44 to 61 can optionally include wherein the proposed radio access license is a radio access license for a Licensed Shared Access (LSA) scheme or Spectrum Access System (SAS) scheme.

In Example 63, the subject matter of any one of Examples 44 to 62 can optionally further include triggering transmission or reception of radio signals on spectrum licensed as part of the radio access license.

In Example 64, the subject matter of any one of Examples 44 to 62 can optionally further include transmitting or receiving radio signals on spectrum licensed as part of the radio access license.

Example 65 is a non-transitory computer readable medium storing program code that when executed by a processor direct the processor to perform the method of any one of Examples 44 to 64.

Example 66 is a processor configured to support execution of program code to perform the method of any one of Examples 44 to 64.

Example 67 is a network control node including a processor configured to perform the method of any one of Examples 44 to 64.

Example 68 is a non-transitory computer readable medium storing instructions that when executed by a processor direct the processor to perform a radio spectrum allocation method including processing requested radio access terms of one or more lower-tiered users and determining available radio access terms of one or more incumbents, comparing the requested radio access terms to the available radio access terms to identify a plurality of candidate radio access licenses, based on an evaluation of the plurality of candidate radio access licenses, selecting a radio access license from the plurality of candidate radio access licenses to direct the one or more lower-tiered users to use or operate based on.

In Example 69, the subject matter of Example 68 can optionally include wherein the evaluation of the plurality of candidate radio access licenses includes rating each of the plurality of candidate radio access licenses based on a predefined rating criteria, wherein selecting a radio access license from the plurality of candidate radio access licenses to direct the one or more lower-tiered users to use or operate based on includes selecting a highest-rated candidate radio access license of the plurality of candidate radio access licenses.

In Example 70, the subject matter of Example 69 can optionally include wherein the predefined rating criteria quantitatively rates each of the plurality of candidate radio access licenses based on the degree to which each candidate radio access license matches the requested radio access terms of the one or more lower-tiered users.

In Example 71, the subject matter of any one of Examples 68 to 70 can optionally include the method further including determining radio conditions of each of the plurality of candidate radio access licenses, wherein selecting a radio access license from the plurality of candidate radio access licenses to direct the one or more incumbents to use or operate based on includes selecting the proposed candidate radio access license based on the determined radio conditions.

In Example 72, the subject matter of Example 71 can optionally include the method further including measuring radio signals with one or more radio sensors, wherein determining the radio conditions of each of the plurality of candidate radio access licenses includes determining the radio conditions of each of the plurality of candidate radio access licenses based on the measured radio signals.

In Example 73, the subject matter of Example 71 or 72 can optionally include wherein determining the radio conditions of each of the plurality of candidate radio access licenses includes identifying one or more parameters of each of the plurality of candidate radio access licenses that are related to radio propagation, and estimating the radio conditions of each of the plurality of candidate radio access licenses by applying a radio propagation model to the one or more parameters of each of the plurality of candidate radio access licenses.

In Example 74, the subject matter of Example 73 can optionally include wherein estimating the radio conditions of each of the plurality of candidate radio access licenses by applying the propagation model to the one or more parameters of each of the plurality of candidate radio access licenses includes generating a radio environment map (REM) for each of the plurality of candidate radio access licenses.

In Example 75, the subject matter of Example 73 or 74 can optionally include wherein the one or more parameters of each of the plurality of candidate radio access licenses that are related to radio propagation include one or more of transmit power, transmitter location, geographic area, antenna pattern, antenna height, access time, or access bandwidth.

In Example 76, the subject matter of any one of Examples 71 to 75 can optionally include wherein selecting the radio access license from the plurality of candidate radio access licenses to direct the one or more lower-tiered users to use or operate based on includes evaluating the determined radio conditions to identify a radio access license of the plurality of candidate radio access licenses that provides advantageous estimated radio conditions and selecting the identified radio access license to propose to the one or more lower-tiered users.

In Example 77, the subject matter of Example 76 can optionally include wherein evaluating the determined radio conditions to identify the radio access license of the plurality of candidate radio access licenses that provides advantageous estimated radio conditions includes identifying radio access licenses that are estimated to provide at least one of low interference or high permitted transmit power.

In Example 78, the subject matter of any one of Examples 71 to 77 can optionally include wherein determining radio conditions of each of the plurality of candidate radio access licenses includes estimating an interference level to at least one of the one or more incumbents or to the one or more lower-tiered users for each of the plurality of candidate radio access licenses.

In Example 79, the subject matter of any one of Examples 68 to 78 can optionally include wherein the requested radio access terms and the available radio access terms include one or more of bandwidth, license duration, incumbent reclaim parameters, interference restrictions, transmit power restrictions, or license price.

In Example 80, the subject matter of any one of Examples 68 to 79 can optionally include the method further including if the one or more lower-tiered users decline the proposed radio access license, generating a plurality of additional candidate radio access licenses and selecting an additional radio access license from the plurality of additional candidate radio access licenses to direct the one or more lower-tiered users to use or operate based on.

In Example 81, the subject matter of Example 80 can optionally include the method further including if the one or more lower-tiered users decline the proposed radio access license, receiving at least one of updated requested radio access terms and updated available radio access terms, wherein selecting the additional radio access license to direct the one or more lower-tiered users to use or operate based on includes selecting the additional radio access license to propose to the one or more lower-tiered users based on at least one of the updated requested radio access terms and the updated available radio access terms.

In Example 82, the subject matter of Example 81 can optionally include the method further including determining radio conditions of each of the plurality of additional candidate radio access licenses, wherein selecting the additional radio access license to propose to the one or more lower-tiered users based on at least one of the updated requested radio access terms and the updated available radio access terms includes selecting the additional radio access license to propose to the one or more lower-tiered users based on the determined radio conditions of each of the plurality of additional candidate radio access licenses.

In Example 83, the subject matter of any one of Examples 68 to 82 can optionally include the method further including receiving an acceptance of the proposed radio access license from the one or more lower-tiered users, and if the one or more incumbents reclaim spectrum of the proposed access license, generating one or more further candidate radio access licenses to propose to the one or more lower-tiered users to replace the reclaimed spectrum.

In Example 84, the subject matter of any one of Examples 68 to 83 can optionally include wherein the one or more incumbents are a plurality of incumbents and wherein the one or more lower-tiered users are a plurality of lower-tiered users, the method further including processing requested radio access terms of each of the plurality of lower-tiered users and determining available radio access terms from each of the plurality of incumbents, and selecting a radio access license to propose to each of the plurality of lower-tiered users based on the requested radio access terms of each of the plurality of lower-tiered users and the available radio access terms of each of the plurality of incumbents.

In Example 85, the subject matter of any one of Examples 68 to 84 can optionally include wherein the proposed radio access license is a radio access license for a spectrum sharing scheme.

In Example 86, the subject matter of any one of Examples 68 to 85 can optionally include wherein the proposed radio access license is a radio access license for a Licensed Shared Access (LSA) scheme or Spectrum Access System (SAS) scheme.

In Example 87, the subject matter of any one of Examples 68 to 86 can optionally include the method further including triggering transmission or reception of radio signals on spectrum licensed as part of the radio access license.

In Example 88, the subject matter of any one of Examples 68 to 86 can optionally include the method further including transmitting or receiving radio signals on spectrum licensed as part of the radio access license.

Example 89 is a network control node including a processor configured to perform a radio spectrum allocation method including processing requested radio access terms of one or more lower-tiered users and determining available radio access terms of one or more incumbents, generating a plurality of candidate radio access licenses based on the requested radio access terms and the available radio access terms, determining radio conditions of each of the plurality of candidate radio access licenses, and based on the determined radio conditions, selecting a radio access license from the plurality of candidate radio access licenses to direct the one or more lower-tiered users to use or operated based on.

In Example 90, the subject matter of Example 81 can optionally include the method further including measuring radio signals with one or more radio sensors, wherein determining the radio conditions of each of the plurality of candidate radio access licenses includes determining the radio conditions of each of the plurality of candidate radio access licenses based on the measured radio signals.

In Example 91, the subject matter of Example 89 or 90 can optionally include wherein determining the radio conditions of each of the plurality of candidate radio access licenses includes identifying one or more parameters of each of the plurality of candidate radio access licenses that are related to radio propagation, and estimating the radio conditions of each of the plurality of candidate radio access licenses by applying a radio propagation model to the one or more parameters of each of the plurality of candidate radio access licenses.

In Example 92, the subject matter of Example 91 can optionally include wherein estimating the radio conditions of each of the plurality of candidate radio access licenses by applying the propagation model to the one or more parameters of each of the plurality of candidate radio access licenses includes generating a radio environment map (REM) for each of the plurality of candidate radio access licenses.

In Example 93, the subject matter of Example 91 or 92 can optionally include wherein the one or more parameters of each of the plurality of candidate radio access licenses that are related to radio propagation include one or more of transmit power, transmitter location, geographic area, antenna pattern, antenna height, access time, or access bandwidth.

In Example 94, the subject matter of any one of Examples 89 to 93 can optionally include wherein selecting the radio access license from the plurality of candidate radio access licenses based on the determined radio conditions includes evaluating the determined radio conditions to identify a radio access license of the plurality of candidate radio access licenses that provides advantageous estimated radio conditions and selecting the identified radio access license to propose to the one or more lower-tiered users.

In Example 95, the subject matter of Example 94 can optionally include wherein evaluating the determined radio conditions to identify the radio access license of the plurality of candidate radio access licenses that provides advantageous estimated radio conditions includes identifying radio access licenses that are estimated to provide at least one of low interference or high permitted transmit power.

In Example 96, the subject matter of any one of Examples 89 to 95 can optionally include wherein estimating radio conditions of each of the plurality of candidate radio access licenses includes estimating an interference level to at least one of the one or more incumbents or to at least one of the one or more lower-tiered users for each of the plurality of candidate radio access licenses, wherein selecting the radio access license from the plurality of candidate radio access licenses based on the determined radio conditions includes selecting the proposed radio access license based on the estimated interference levels.

In Example 97, the subject matter of any one of Examples 89 to 96 can optionally include wherein the requested radio access terms and the available radio access terms include one or more of bandwidth, license duration, incumbent reclaim parameters, interference restrictions, transmit power restrictions, or license price.

In Example 98, the subject matter of any one of Examples 89 to 97 can optionally include wherein selecting the radio access license from the plurality of candidate radio access licenses based on the determined radio conditions includes rating each of the plurality of candidate radio access licenses based on the determined radio conditions, and selecting a highest-rated radio access license from the plurality of candidate radio access licenses to propose to the one or more lower-tiered users.

In Example 99, the subject matter of any one of Examples 89 to 98 can optionally include the method further including if the one or more lower-tiered users decline the selected radio access license, generating a plurality of additional candidate radio access licenses and selecting an additional radio access license from the plurality of additional candidate radio access licenses to direct the one or more lower-tiered users to use or operate based on.

In Example 100, the subject matter of any one of Examples method further including can optionally include if the one or more lower-tiered users decline the selected radio access license, receiving at least one of updated requested radio access terms and updated available radio access terms, wherein selecting the additional radio access license to direct the one or more lower-tiered users to use or operate based on includes selecting the additional radio access license to propose to the one or more lower-tiered users based on at least one of the updated requested radio access terms and the updated available radio access terms.

In Example 101, the subject matter of Example 100 can optionally include the method further including estimating radio conditions of each of the plurality of additional candidate radio access licenses, wherein selecting the additional radio access license to propose to the one or more lower-tiered users based on at least one of the updated requested radio access terms and the updated available radio access terms includes selecting the additional radio access license to propose to the one or more lower-tiered users based on the determined radio conditions of each of the plurality of additional candidate radio access licenses.

In Example 102, the subject matter of any one of Examples 89 to 101 can optionally include the method further including receiving an acceptance of the proposed radio access license from the one or more lower-tiered users, and if the one of the one or more incumbents reclaim spectrum of the proposed access license, generating one or more further candidate radio access licenses to propose to the one or more lower-tiered users to replace the reclaimed spectrum.

In Example 103, the subject matter of any one of Examples 89 to 102 can optionally include wherein the one or more incumbents are a plurality of incumbents and wherein the one or more lower-tiered users are a plurality of lower-tiered users, the network control node further including processing requested radio access terms of each of the plurality of lower-tiered users and determining available radio access terms from each of the plurality of incumbents, and selecting a radio access license to propose to each of the plurality of lower-tiered users based on the requested radio access terms of each of the plurality of lower-tiered users and the available radio access terms of each of the plurality of incumbents.

In Example 104, the subject matter of Example 103 can optionally include the method further including generating a plurality of further candidate radio access licenses based on the requested radio access terms of each of the plurality of lower-tiered users and the available radio access terms of each of the plurality of incumbents, and jointly evaluating a subset of the plurality of further candidate radio access licenses with a radio propagation model to identify candidate radio access licenses that are expected to provide reduced interference.

In Example 105, the subject matter of any one of Examples 89 to 104 can optionally include wherein the proposed radio access license is a radio access license for a spectrum sharing scheme.

In Example 106, the subject matter of any one of Examples 89 to 105 can optionally include wherein the proposed radio access license is a radio access license for a Licensed Shared Access (LSA) scheme or Spectrum Access System (SAS) scheme.

In Example 107, the subject matter of any one of Examples 99 to 106 can optionally include the method further including triggering transmission or reception of radio signals on spectrum licensed as part of the radio access license.

In Example 108, the subject matter of any one of Examples 99 to 106 can optionally include the method further including transmitting or receiving radio signals on spectrum licensed as part of the radio access license.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A non-transitory computer readable medium storing instructions that when executed by a processor direct the processor to perform a radio spectrum allocation method comprising:
   processing requested radio access terms of one or more lower-tiered users and determining available radio access terms from one or more incumbents;
   generating a plurality of candidate radio access licenses based on the requested radio access terms and the available radio access terms;
   determining radio conditions of each of the plurality of candidate radio access licenses; and
   based on the determined radio conditions, selecting a radio access license from the plurality of candidate radio access licenses and directing the one or more lower-tiered users to use the selected radio access license or operated based on the selected radio access license.

2. The non-transitory computer readable medium of claim 1, the method further comprising:
   measuring radio signals with one or more radio sensors, wherein determining the radio conditions of each of the plurality of candidate radio access licenses comprises:
   determining the radio conditions of each of the plurality of candidate radio access licenses based on the measured radio signals.

3. The non-transitory computer readable medium of claim 1, wherein determining the radio conditions of each of the plurality of candidate radio access licenses comprises:
   identifying one or more parameters of each of the plurality of candidate radio access licenses that are related to radio propagation; and
   estimating the radio conditions of each of the plurality of candidate radio access licenses by applying a radio propagation model to the one or more parameters of each of the plurality of candidate radio access licenses.

4. The non-transitory computer readable medium of claim 1, wherein the requested radio access terms and the available radio access terms comprise one or more of bandwidth, license duration, incumbent reclaim parameters, interference restrictions, transmit power restrictions, or license price.

5. The non-transitory computer readable medium of claim 1, wherein selecting the radio access license from the plurality of candidate radio access licenses based on the determined radio conditions comprises:
   rating each of the plurality of candidate radio access licenses based on the determined radio conditions; and
   selecting a highest-rated radio access license from the plurality of candidate radio access licenses to propose to the one or more lower-tiered users.

6. The non-transitory computer readable medium of claim 1, the method further comprising:
   if the one or more lower-tiered users decline the proposed radio access license, generating a plurality of additional candidate radio access licenses and selecting an additional radio access license from the plurality of additional candidate radio access licenses to direct the one or more lower-tiered users to user or operate based on.

7. The non-transitory computer readable medium of claim 6, the method further comprising:
   if the one or more lower-tiered users decline the selected radio access license, receiving at least one of updated requested radio access terms and updated available radio access terms, wherein selecting the additional radio access license to direct the one or more lower-tiered users to user or operate based on comprises selecting the additional radio access license to propose to the one or more lower-tiered users based on at least one of the updated requested radio access terms and the updated available radio access terms.

8. The non-transitory computer readable medium of claim 1, wherein the proposed radio access license is a radio access license for a spectrum sharing scheme.

9. The non-transitory computer readable medium of claim 1, wherein the proposed radio access license is a radio access license for a Licensed Shared Access (LSA) scheme or Spectrum Access System (SAS) scheme.

10. A non-transitory computer readable medium storing instructions that when executed by a processor direct the processor to perform a radio spectrum allocation method comprising:
    processing requested radio access terms of one or more lower-tiered users and determining available radio access terms of one or more incumbents;
    comparing the requested radio access terms to the available radio access terms to identify a plurality of candidate radio access licenses;
    based on an evaluation of the plurality of candidate radio access licenses, selecting a radio access license from the plurality of candidate radio access licenses to direct the one or more lower-tiered users to use or operate based on.

11. The non-transitory computer readable medium of claim 10, wherein the evaluation of the plurality of candidate radio access licenses comprises:
rating each of the plurality of candidate radio access licenses based on a predefined rating criteria, wherein selecting a radio access license from the plurality of candidate radio access licenses to direct the one or more lower-tiered users to use or operate based on comprises selecting a highest-rated candidate radio access license of the plurality of candidate radio access licenses.

12. The non-transitory computer readable medium of claim 11, wherein the predefined rating criteria quantitatively rates each of the plurality of candidate radio access licenses based on the degree to which each candidate radio access license matches the requested radio access terms of the one or more lower-tiered users.

13. The non-transitory computer readable medium of claim 10, the method further comprising:
determining radio conditions of each of the plurality of candidate radio access licenses, wherein selecting a radio access license from the plurality of candidate radio access licenses to direct the one or more incumbents to use or operate based on comprises selecting the proposed candidate radio access license based on the determined radio conditions.

14. The non-transitory computer readable medium of claim 13, the method further comprising measuring radio signals with one or more radio sensors, wherein determining the radio conditions of each of the plurality of candidate radio access licenses comprises:
determining the radio conditions of each of the plurality of candidate radio access licenses based on the measured radio signals.

15. The non-transitory computer readable medium of claim 13, wherein determining the radio conditions of each of the plurality of candidate radio access licenses comprises:
identifying one or more parameters of each of the plurality of candidate radio access licenses that are related to radio propagation; and
estimating the radio conditions of each of the plurality of candidate radio access licenses by applying a radio propagation model to the one or more parameters of each of the plurality of candidate radio access licenses.

16. The non-transitory computer readable medium of claim 10, the method further comprising:
if the one or more lower-tiered users decline the proposed radio access license, generating a plurality of additional candidate radio access licenses and selecting an additional radio access license from the plurality of additional candidate radio access licenses to direct the one or more lower-tiered users to use or operate based on.

17. The non-transitory computer readable medium of claim 16, the method further comprising:
if the one or more lower-tiered users decline the proposed radio access license, receiving at least one of updated requested radio access terms and updated available radio access terms, wherein selecting the additional radio access license to direct the one or more lower-tiered users to use or operate based on comprises selecting the additional radio access license to propose to the one or more lower-tiered users based on at least one of the updated requested radio access terms and the updated available radio access terms.

18. The non-transitory computer readable medium of claim 10, wherein the one or more incumbents are a plurality of incumbents and wherein the one or more lower-tiered users are a plurality of lower-tiered users, the method further comprising:
processing requested radio access terms of each of the plurality of lower-tiered users and determining available radio access terms from each of the plurality of incumbents; and
selecting a radio access license to propose to each of the plurality of lower-tiered users based on the requested radio access terms of each of the plurality of lower-tiered users and the available radio access terms of each of the plurality of incumbents.

19. The non-transitory computer readable medium of claim 10, wherein the proposed radio access license is a radio access license for a spectrum sharing scheme.

20. A network control node including a processor configured to perform a radio spectrum allocation method comprising:
processing requested radio access terms of one or more lower-tiered users and determining available radio access terms of one or more incumbents;
generating a plurality of candidate radio access licenses based on the requested radio access terms and the available radio access terms;
determining radio conditions of each of the plurality of candidate radio access licenses; and
based on the determined radio conditions, selecting a radio access license from the plurality of candidate radio access licenses to direct the one or more lower-tiered users to use or operated based on.

21. The network control node of claim 20, wherein determining the radio conditions of each of the plurality of candidate radio access licenses comprises:
identifying one or more parameters of each of the plurality of candidate radio access licenses that are related to radio propagation; and
estimating the radio conditions of each of the plurality of candidate radio access licenses by applying a radio propagation model to the one or more parameters of each of the plurality of candidate radio access licenses.

* * * * *